United States Patent
Lin et al.

(10) Patent No.: US 11,109,057 B2
(45) Date of Patent: Aug. 31, 2021

(54) OVERLAPPED BLOCK MOTION COMPENSATION BASED ON BLENDED PREDICTORS

(71) Applicant: MEDIATEK INC., Hsinchu (TW)

(72) Inventors: Zhi-Yi Lin, Hsinchu (TW); Tzu-Der Chuang, Hsinchu (TW); Chun-Chia Chen, Hsinchu (TW); Ching-Yeh Chen, Hsinchu (TW); Chih-Wei Hsu, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/047,443

(22) PCT Filed: Apr. 15, 2019

(86) PCT No.: PCT/CN2019/082675
§ 371 (c)(1),
(2) Date: Oct. 14, 2020

(87) PCT Pub. No.: WO2019/201203
PCT Pub. Date: Oct. 24, 2019

(65) Prior Publication Data
US 2021/0076061 A1 Mar. 11, 2021

Related U.S. Application Data

(60) Provisional application No. 62/751,755, filed on Oct. 29, 2018, provisional application No. 62/750,279,
(Continued)

(51) Int. Cl.
*H04N 7/18* (2006.01)
*H04N 19/52* (2014.01)
(Continued)

(52) U.S. Cl.
CPC .......... *H04N 19/52* (2014.11); *H04N 19/105* (2014.11); *H04N 19/137* (2014.11);
(Continued)

(58) Field of Classification Search
CPC .... H04N 19/52; H04N 19/137; H04N 19/159; H04N 19/105; H04N 19/176; H04N 19/583; H04N 19/186
(Continued)

(56) References Cited

U.S. PATENT DOCUMENTS

| | | | |
|---|---|---|---|
| 2012/0177120 A1 | 7/2012 | Guo et al. | |
| 2013/0128974 A1* | 5/2013 | Chien | H04N 19/583 375/240.15 |

(Continued)

FOREIGN PATENT DOCUMENTS

| | | |
|---|---|---|
| CN | 101222636 A | 7/2008 |
| CN | 101237581 A | 8/2008 |

(Continued)

OTHER PUBLICATIONS

Wang et al, Coding mode adapted overlapped block motion compensation in H.264 (Year: 2006).*

(Continued)

*Primary Examiner* — Shan E Elahi
(74) *Attorney, Agent, or Firm* — McClure, Qualey & Rodack, LLP

(57) ABSTRACT

Exemplary video processing methods and apparatuses for coding a current block by overlapped sub-block motion compensation split the current block into overlapped sub-blocks, determine a sub-block MV for each overlapped sub-block, derive an initial predictor for each sub-block by motion compensation using the sub-block MV, derive a final predictor for each overlapped region by blending the initial predictors of the overlapped region, and encode or decode (Continued)

the current block based on the final predictors. Exemplary video processing methods and apparatuses for coding blocks with OBMC generate a converted MV by changing a MV to an integer MV or changing a MV component to an integer component, derive an OBMC region by motion compensation using the converted MVs, and encode or decode the blocks by blending an OBMC predictor with an original predictor.

26 Claims, 12 Drawing Sheets

Related U.S. Application Data filed on Oct. 25, 2018, provisional application No. 62/657,995, filed on Apr. 16, 2018.

(51) Int. Cl.
| | | |
|---|---|---|
| *H04N 19/105* | (2014.01) | |
| *H04N 19/137* | (2014.01) | |
| *H04N 19/159* | (2014.01) | |
| *H04N 19/176* | (2014.01) | |
| *H04N 19/186* | (2014.01) | |
| *H04N 19/583* | (2014.01) | |

(52) U.S. Cl.
CPC ......... *H04N 19/159* (2014.11); *H04N 19/176* (2014.11); *H04N 19/186* (2014.11); *H04N 19/583* (2014.11)

(58) Field of Classification Search
USPC .................................................. 375/240.12
See application file for complete search history.

(56) References Cited

U.S. PATENT DOCUMENTS

| | | | |
|---|---|---|---|
| 2014/0092978 A1* | 4/2014 | Bugdayci | H04N 19/30 375/240.16 |
| 2014/0139296 A1* | 5/2014 | Marsili | H03K 7/08 332/109 |
| 2015/0049802 A1 | 2/2015 | Bordes et al. | |
| 2015/0139296 A1* | 5/2015 | Yu | H04N 19/70 375/240.02 |
| 2015/0163509 A1* | 6/2015 | Hsu | H04N 19/583 375/240.16 |
| 2015/0304662 A1* | 10/2015 | Liu | H04N 19/186 375/240.13 |
| 2016/0219302 A1* | 7/2016 | Liu | H04N 19/583 |
| 2016/0330475 A1 | 11/2016 | Zhou | |
| 2018/0063553 A1* | 3/2018 | Zhang | H04N 19/463 |

FOREIGN PATENT DOCUMENTS

| | | |
|---|---|---|
| CN | 104754362 A | 7/2015 |
| CN | 106713918 A | 5/2017 |

OTHER PUBLICATIONS

International Search Report and Written Opinion dated Jul. 12, 2019, issued in application No. PCT/CN2019/082675.

Chinese language office action dated Mar. 13, 2020, issued in application No. TW 108113166.

\* cited by examiner

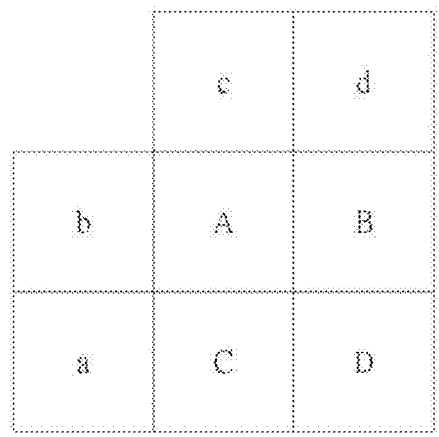
Fig. 5
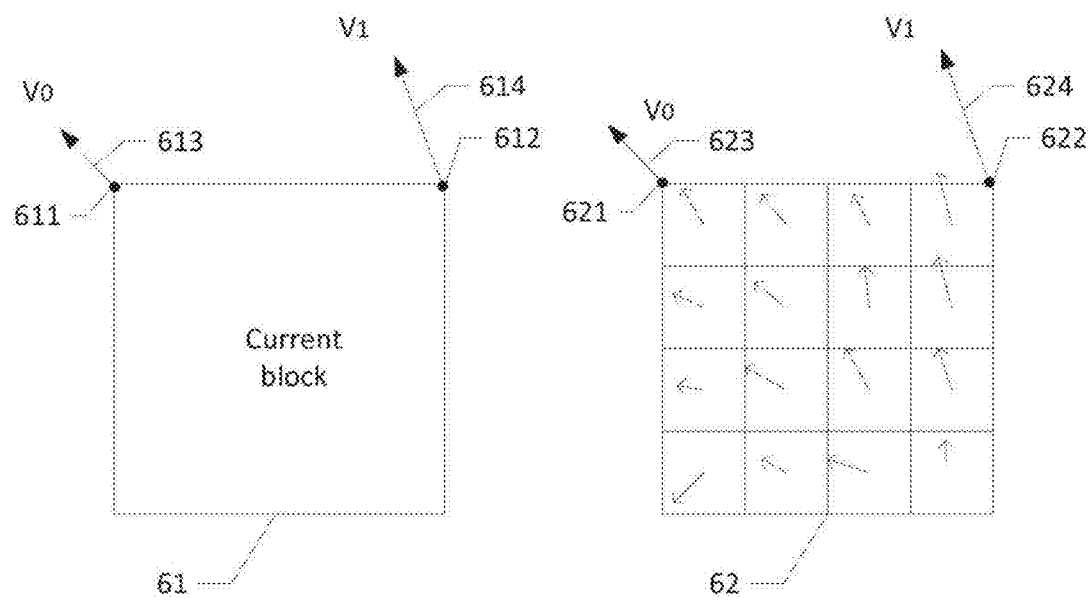
Fig. 6A                                      Fig. 6B

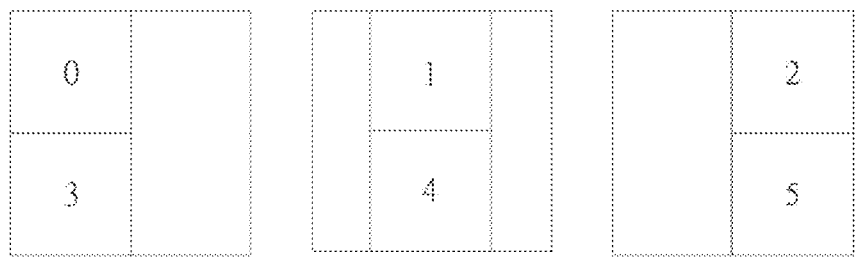
Fig. 9A
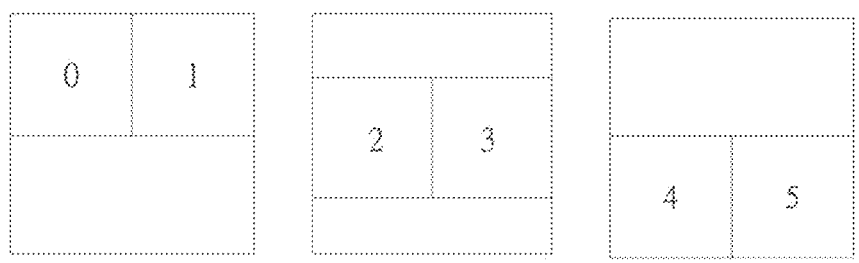
Fig. 9B
Fig. 9C
Fig. 9D

OVERLAPPED BLOCK MOTION COMPENSATION BASED ON BLENDED PREDICTORS

CROSS REFERENCE TO RELATED APPLICATION'

The present invention claims priority to U.S. Provisional Patent Application Ser. No. 62/657,995, filed on Apr. 16, 2018, entitled "Simplified overlapped block motion compensation for subblock mode", U.S. Provisional Patent Application Ser. No. 62/750,279, filed on Oct. 25, 2018, entitled "Methods of Overlapped Blocks Motion Compensation with modified MV", and U.S. Provisional Patent Application Ser. No. 62/751,755, filed on Oct. 29, 2018, entitled "Method of Overlapped Blocks Motion Compensation with modified MV and MV constraints". The U.S. Provisional patent applications are hereby incorporated by reference in their entireties.

FIELD OF THE INVENTION

The present invention relates to video processing methods and apparatuses in video encoding and decoding systems. In particular, the present invention relates to overlapped sub-block motion compensation or simplified overlapped block motion compensation.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its preceding standard H.264/AVC to meet the demand for higher picture resolutions, higher frame rates, and better video qualities. During development of the HEVC standard, several proposals associated with Overlapped Block Motion Compensation (OBMC) were made to improve coding efficiency.

OBMC The fundamental principle of OBMC finds a Linear Minimum Mean Squared Error (LMMSE) estimate of a pixel intensity value based on motion compensated signals derived from its nearby block Motion Vectors (MVs). From estimation-theoretic perspective, these MVs are regarded as different plausible hypotheses for its true motion, and to maximize coding efficiency, the weights for the MVs are determined to minimize the mean squared prediction error subject to the unit-gain constraint. OBMC was proposed to improve visual quality of reconstructed video while providing coding gain for boundaries pixels. In an example of applying OBMC to a geometry partition, since two different MVs are used for motion compensation, pixels at the partition boundary typically have large discontinuities and result in visual artifacts such as block artifacts. These discontinuities decrease the transform efficiency. For example, two regions created by a geometry partition are denoted as region 1 and region 2, a pixel from region 1 is defined as a boundary pixel if any of its four connected neighboring pixels (i.e. left, top, right, and bottom pixels) belongs to region 2, and a pixel from region 2 is defined as a boundary pixel if any of its four connected neighboring pixels belongs to region 1. FIG. 1 illustrates an example of boundary pixels between two regions of a block. Grey-shaded pixels 122 belong to the boundary of a first region 12 at the top-left half of the block, and white-shaded pixels 142 belong to the boundary of a second region 14 at the bottom-right half of the block. For each boundary pixel, motion compensation is performed using a weighted sum of motion predictors retrieved according to the MVs of the first region 12 and second region 14. The weights are ¾ for the predictor retrieved using the MV of the region containing the boundary pixel and ¼ for the predictor retrieved using the MV of the other region.

OBMC is also used to smooth boundary pixels of symmetrical motion partitions such as two 2N×N or N×2N Prediction Units (PUs) partitioned from a 2N×2N Coding Unit (CU). OBMC is applied to the horizontal boundary of two 2N×N PUs and the vertical boundary of two N×2N PUs. Pixels at the partition boundary may have large discontinuities as partitions are reconstructed using different MVs. OBMC is applied to alleviate visual artifacts and improve transform/coding efficiency. FIG. 2A demonstrates an example of applying OBMC to two 2N×N blocks and FIG. 2B demonstrates an example of applying OBMC to two N×2N blocks. Grey pixels in FIG. 2A or FIG. 2B are pixels belonging to Partition 0 and white pixels are pixels belonging to Partition 1. The overlapped region in a luminance (luma) component is defined as two rows of pixels on each side of the horizontal boundary and two columns of pixels on each side of the vertical boundary. For pixels which are one row or one column apart from the partition boundary, i.e. pixels labeled as A in FIG. 2A and FIG. 2B, OBMC weighting factors are (¾, ¼) for the original predictor and OBMC predictor respectively. For pixels which are two rows or two columns apart from the partition boundary, i.e., pixels labeled as B, OBMC weighting factors are (⅞, ⅛) for the original predictor and OBMC predictor respectively. For chrominance (chroma) components, the overlapped region is defined as one row of pixel on each side of the horizontal boundary and one column of pixel on each side of the vertical boundary, and the weighting factors are (¾, ¼) for the original predictor and OBMC predictor respectively.

Skip and Merge Skip and Merge modes were proposed and adopted in the HEVC standard to increase the coding efficiency of motion information by inheriting the motion information from spatially neighboring blocks or a temporally collocated block. To code a PU in Skip or Merge mode, instead of signaling motion information, only an index representing a final candidate selected from a candidate set is signaled. The motion information reused by the PU coded in Skip or Merge mode includes a motion vector (MV), an inter prediction indicator, and a reference picture index of the selected final candidate. It is noted that if the selected final candidate is a temporal motion candidate, the reference picture index is always set to zero. Prediction residual is coded when the PU is coded in Merge mode, however, the Skip mode further skips signaling of the prediction residual as the residual data of a PU coded in Skip mode is forced to be zero.

A Merge candidate set in the HEVC standard for a current PU 30 consists of four spatial motion candidates associated with neighboring blocks of the current PU 30 and one temporal motion candidate associated with a collocated PU 32 of the current PU 30. As shown in FIG. 3, the first Merge candidate is a left predictor Ai 312, the second Merge candidate is a top predictor $B_1$ 314, the third Merge candidate is a right above predictor $B_0$ 313, and a fourth Merge candidate is a left below predictor $A_0$ 311. A left above predictor $B_2$ 315 is included in the Merge candidate set to replace an unavailable spatial predictor. A fifth Merge candidate is a temporal predictor of first available temporal predictors $T_{BR}$ 321 and $T_{CTR}$ 322. The encoder selects one final candidate from the candidate set for each PU coded in Skip or Merge mode based on motion vector compensation such as through a Rate-Distortion Optimization (RDO) decision, and an index representing the selected final candidate is signaled to the decoder. The decoder selects the same final candidate from the candidate set according to the index transmitted in the video bitstream. Since the derivations of Skip and Merge candidates are similar, the "Merge" mode referred hereafter may correspond to Merge mode as well as Skip mode for convenience.

Sub-block motion compensation is employed in many recently developed coding tools such as subblock Temporal Motion Vector Prediction (sbTMVP), Spatial-Temporal Motion Vector Prediction (STMVP), Pattern-based Motion Vector Derivation (PMVD), and Affine Motion Compensation Prediction (MCP) to increase the accuracy of the prediction process. A CU or a PU in sub-block motion compensation is divided into multiple sub-blocks, and these sub-blocks within the CU or PU may have different reference pictures and different MVs. A high bandwidth is therefore demanded for sub-block motion compensation especially when MVs of each sub-block are very diverse. Some of the sub-block motion compensation coding tools are described in the following paragraphs.

Sub-PU TMVP Subblock Temporal Motion Vector Prediction (Subblock TMVP, SbTMVP) is applied to the Merge mode by including at least one SbTMVP candidate as a Merge candidate in the candidate set. SbTMVP is also referred to as Alternative Temporal Motion Vector Prediction (ATMVP). A current PU is partitioned into smaller sub-PUs, and corresponding temporal collocated motion vectors of the sub-PUs are searched. An example of the SbTMVP technique is illustrated in FIG. 4, where a current PU 41 of size M×N is divided into (M/P)×(N/Q) sub-PUs, each sub-PU is of size P×Q, where M is divisible by P and N is divisible by Q. The detail algorithm of the SbTMVP mode may be described in three steps as follows.

In step 1, an initial motion vector is assigned for the current PU 41, denoted as vec_init. The initial motion vector is typically the first available candidate among spatial neighboring blocks. For example, List X is the first list for searching collocated information, and vec_init is set to List X MV of the first available spatial neighboring block, where X is 0 or 1. The value of X (0 or 1) depends on which list is better for inheriting motion information, for example, List 0 is the first list for searching when the Picture Order Count (POC) distance between the reference picture and current picture is closer than the POC distance in List 1. List X assignment may be performed at slice level or picture level. After obtaining the initial motion vector, a "collocated picture searching process" begins to find a main collocated picture, denoted as main_colpic, for all sub-PUs in the current PU. The reference picture selected by the first available spatial neighboring block is first searched, after that, all reference pictures of the current picture are searched sequentially. For B-slices, after searching the reference picture selected by the first available spatial neighboring block, the search starts from a first list (List 0 or List 1) reference index 0, then index 1, then index 2, until the last reference picture in the first list, when the reference pictures in the first list are all searched, the reference pictures in a second list are searched one after another. For P-slice, the reference picture selected by the first available spatial neighboring block is first searched; followed by all reference pictures in the list starting from reference index 0, then index 1, then index 2, and so on. During the collocated picture searching process, "availability checking" checks the collocated sub-PU around the center position of the current PU pointed by vec_init_scaled is coded by an inter or intra mode for each searched picture. Vec_init_scaled is the MV with appropriated MV scaling from vec_init. Some embodiments of determining "around the center position" are a center pixel (M/2, N/2) in a PU size M×N, a center pixel in a center sub-PU, or a mix of the center pixel or the center pixel in the center sub-PU depending on the shape of the current PU. The availability checking result is true when the collocated sub-PU around the center position pointed by vec_init_scaled is coded by an inter mode. The current searched picture is recorded as the main collocated picture main_colpic and the collocated picture searching process finishes when the availability checking result for the current searched picture is true. The MV of the around center position is used and scaled for the current block to derive a default MV if the availability checking result is true. If the availability checking result is false, that is when the collocated sub-PU around the center position pointed by vec_init_scaled is coded by an intra mode, it goes to search a next reference picture. MV scaling is needed during the collocated picture searching process when the reference picture of vec_init is not equal to the original reference picture. The MV is scaled depending on temporal distances between the current picture and the reference picture of vec_init and the searched reference picture, respectively. After MV scaling, the scaled MV is denoted as vec_init_scaled.

In step 2, a collocated location in main_colpic is located for each sub-PU. For example, corresponding location 421 and location 422 for sub-PU 411 and sub-PU 412 are first located in the temporal collocated picture 42 (main_colpic). The collocated location for a current sub-PU i is calculated in the following:

collocated location $x$=Sub-PU_$i$_$x$+vec_init_scaled_$i$_$x$(integer part)+shift_$x$, collocated location $y$=Sub-PU_$i$_$y$+vec_init_scaled_$i$_$y$(integer part)+shift_$y$, where Sub-PU_i_x represents a horizontal left-top location of sub-PU i inside the current picture, Sub-PU_i_y represents a vertical left-top location of sub-PU i inside the current picture, vec_init_scaled_i_x represents a horizontal component of the scaled initial motion vector for sub-PU i (vec_init_scaled_i), vec_init_scaled_i_y represents a vertical component of vec_init_scaled_i, and shift_x and shift_y represent a horizontal shift value and a vertical shift value respectively. To reduce the computational complexity, only integer locations of Sub-PU_i_x and Sub-PU_i_y, and integer parts of vec_init_scaled_i_x, and vec_init_scaled_i_y are used in the calculation. In FIG. 4, the collocated location 425 is pointed by vec_init_sub_0 423 from location 421 for sub-PU 411 and the collocated location 426 is pointed by vec_init_sub_1 424 from location 422 for sub-PU 412.

In step 3 of the SbTMVP mode, motion information (MI) for each sub-PU, denoted as SubPU_MI_i, is obtained from collocated_picture_i_L0 and collocated_picture_i_L1 on collocated location x and collocated location y. MI is defined as a set of {MV_x, MV_y, reference lists, reference index, and other merge-mode-sensitive information, such as a local illumination compensation flag}. Moreover, MV_x and MV_y may be scaled according to the temporal distance relation between a collocated picture, current picture, and reference picture of the collocated MV. If MI is not available for some sub_PU, MI of a sub_PU around the center position will be used, or in another word, the default MV will be used. As shown in FIG. 4, subPU0_MV 427 obtained from the collocated location 425 and subPU1_MV 428 obtained from the collocated location 426 are used to derive predictors for sub-PU 411 and sub-PU 412 respectively. Each sub-PU in the current PU 41 derives its own predictor according to the MI obtained on corresponding collocated location.

STMVP In JEM-3.0, a Spatial-Temporal Motion Vector Prediction (STMVP) is used to derive a new candidate to be included in a candidate set for Skip or Merge mode. Motion vectors of sub-blocks are derived recursively following a raster scan order using temporal and spatial motion vector predictors. FIG. 5 illustrates an example of one CU with four sub-blocks and its neighboring blocks for deriving a STMVP candidate. The CU in FIG. 5 is 8×8 containing four 4×4 sub-blocks, A, B, C and D, and neighboring N×N blocks in the current picture are labeled as a, b, c, and d. The STMVP candidate derivation for sub-block A starts by identifying its two spatial neighboring blocks. The first neighboring block c is a N×N block above sub block A, and the second neighboring block b is a N×N block to the left of the sub-block A. Other N×N block above sub-block A, from left to right, starting at block c, are checked if block c is unavailable or block c is intra coded. Other N×N block to the left of sub-block A, from top to bottom, starting at block b, are checked if block b is unavailable or block b is intra coded. Motion information obtained from the two neighboring blocks for each list are scaled to a first reference picture for a given list. A temporal motion vector predictor (TMVP) of sub-block A is then derived by following the same procedure of TMVP derivation as specified in the HEVC standard. Motion information of a collocated block at location D is fetched and scaled accordingly. Finally, all available motion vectors are averaged separately for each reference list. The averaged motion vector is assigned as the motion vector of the current sub-block.

PMVD A Pattern-based MV Derivation (PMVD) method, also referred as FRUC (Frame Rate Up Conversion) or DMVR (Decoder-side MV Refinement), consists of bilateral matching for bi-prediction block and template matching for a uni-prediction block. A FRUC_mrg_flag is signaled when Merge or Skip flag is true, and if FRUC_mrg_flag is true, a FRUC_merge_mode is signaled to indicate whether the bilateral matching Both bilateral matching Merge mode and template matching Merge mode consist of two-stage matching: the first stage is PU-level matching, and the second stage is sub-PU-level matching. In the PU-level matching, multiple initial MVs in LIST_0 and LIST_1 are selected respectively. These MVs includes MVs from Merge candidates (i.e., conventional Merge candidates such as these specified in the HEVC standard) and MVs from temporal derived MVPs. Two different starting MV sets are generated for two lists. For each MV in one list, a MV pair is generated by composing of this MV and the mirrored MV that is derived by scaling the MV to the other list. For each MV pair, two reference blocks are compensated by using this MV pair. The Sum of Absolute Differences (SAD) of these two blocks is calculated. The MV pair with the smallest SAD is selected as the best MV pair. Then a diamond search is performed to refine the MV pair. The refinement precision is ⅛-pel. The refinement search range is restricted within ±8 pixels. The final MV pair is the PU-level derived MV pair.

The sub-PU-level searching in the second stage searches a best MV pair for each sub-PU. The current PU is divided into sub-PUs, where the depth of sub-PU is signaled in Sequence Parameter Set (SPS) with a minimum sub-PU size of 4×4. Several starting MVs in List 0 and List 1 are selected for each sub-PU, which includes PU-level derived MV pair, zero MV, HEVC collocated TMVP of the current sub-PU and bottom-right block, temporal derived MVP of the current sub-PU, and MVs of left and above PUs or sub-PUs. By using the similar mechanism in PU-level searching, the best MV pair for each sub-PU is selected. Then the diamond search is performed to refine the best MV pair. Motion compensation for each sub-PU is then performed to generate a predictor for each sub-PU.

Affine MCP Affine Motion Compensation Prediction (Affine MCP) is a technique developed for predicting various types of motion other than the translation motion. For example, rotation, zoom in, zoom out, perspective motions and other irregular motions. An exemplary simplified affine transform MCP as shown in FIG. 6A is applied in JEM-3.0 to improve the coding efficiency. An affine motion field of a current block 61 is described by motion vectors 613 and 614 of two control points 611 and 612. The Motion Vector Field (MVF) of a block is described by the following equations:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

Where $(v_{0x}, v_{0y})$ represents the motion vector 613 of the top-left corner control point 611, and $(v_{1x}, v_{1y})$ represents the motion vector 614 of the top-right corner control point 612.

A block based affine transform prediction is applied instead of pixel based affine transform prediction in order to further simplify the affine motion compensation prediction. FIG. 6B illustrates partitioning a current block 62 into sub-blocks and affine MCP is applied to each sub-block. As shown in FIG. 6B, a motion vector of a center sample of each 4×4 sub-block is calculated according to the above equation in which $(v_{0x}, v_{0y})$ represents the motion vector 623 of the top-left corner control point 621, and $(v_{1x}, v_{1y})$ represents the motion vector 624 of the top-right corner control point 622, and then rounded to 1/16 fraction accuracy. Motion compensation interpolation is applied to generate a predictor for each sub-block according to the derived motion vector. After performing motion compensation prediction, the high accuracy motion vector of each sub-block is rounded and stored with the same accuracy as a normal motion vector.

A CU or a PU is divided into multiple sub-blocks when coded in one of the sub-block motion compensation coding tools, and these sub-blocks may have different reference pictures and different MVs. A high bandwidth is demanded for sub-block motion compensation and high computational complexity is required for applying OBMC to blocks coded in sub-block motion compensation. FIG. 7A illustrates an example of applying OBMC on a CU coded without sub-block motion compensation mode, and FIG. 7B illustrates an example of applying OBMC on a CU coded with a sub-block motion compensation mode. When OBMC applies to a current sub-block, beside current motion vectors, motion vectors of four connected neighboring sub-blocks, if available and are not identical to the current motion vector, are also used to derive a final predictor for the current sub-block. Multiple predictors derived based on multiple motion vectors are combined to generate the final predictor. In FIG. 7A, a final predictor for a current CU is calculated by using weighted sum of a current motion compensated predictor C derived by a current MV, an OBMC predictor A' derived from a MV of an above neighboring block A, and an OBMC predictor B' derived from a MV of a left neighboring block B. In FIG. 7B, a final predictor for a current sub-block is calculated by using weighted sum of a current motion compensated predictor C derived by a current MV, an OBMC predictor A' derived from a MV of an above neighboring block, an OBMC predictor B' derived from a MV of a left neighboring block, an OBMC predictor D' derived from a MV of a right sub-block D, and an OBMC predictor E' derived from a MV of a bottom sub-block E.

An OBMC predictor based on a MV of a neighboring block/sub-block is denoted as PN, with N indicating an index for above, below, left and right neighboring blocks/sub-blocks. An original predictor based on a MV of a current block/sub-block is denoted as PC. If PN is based on motion information of a neighboring block/sub-block that contains the same motion information as the current block/sub-block, OBMC is not performed from this PN. Otherwise, every sample of PN is added to the same sample in PC. In JEM, four rows or four columns of PN are added to PC, and weighting factors for PN are {¼, ⅛, 1/16, 1/32} and weighting factors for PC are {¾, ⅞, 15/16, 31/32} respectively. In cases of applying OBMC in small MC blocks, when a height or width of coding block is equal to 4 or when a CU is coded with sub-CU mode, only two rows or two columns of PN are added to PC. The weighting factors are {¼, ⅛} and {¾, ⅞} for PN and PC respectively. For PN generated based on motion vectors of a vertically (horizontally) neighboring sub-block, samples in the same row (column) of PN are added to PC with a same weighting factor. The OBMC process generating a final predictor by weighted sum is performed one by one sequentially which induces high computation complexity and data dependency.

OBMC may be switched on and off according to a CU level flag when a CU size is less than or equal to 256 luma samples in JEM. For CUs with size larger than 256 luma samples or not coded with AMVP mode, OBMC is applied by default. OBMC is performed for all Motion Compensation (MC) block boundaries except right and bottom boundaries of a CU when OBMC is enabled. OBMC is applied to both luma and chroma components. A MC block corresponds to a coding block if the CU is coded without sub-block MC, or a MC block corresponds to a sub-block in the CU if coded with sub-block MC.

At the encoder, when OBMC is applied to a CU, the impact is taken into account during the motion estimation stage. OBMC predictors derived using motion information of top and left neighboring blocks are used to compensate the top and left boundaries of an original predictor of the current CU, and then normal motion estimation process is applied.

OBMC may be performed after the normal Motion Compensation (MC). Bidirectional Optical Flow (BDOF) is separately applied in both OBMC and normal MC if OBMC is performed after normal MC. That is, MC results for the overlapped region between two CUs or PUs are generated by the OBMC process not in the normal MC process. BDOF is applied to refine these two MC results. Redundant OBMC and BDOF processes may be skipped when two neighboring MVs are the same. However, the required bandwidth and MC operations for the overlapped region is increased compared to integrating the OBMC process into the normal MC process. Since fractional-pixel motion vectors are supported in newer coding standards, additional reference pixels around the reference block are retrieved according to the number of interpolation taps for interpolation calculations. In one example, a current PU size is 16×8, an OBMC region is 16×2, and an 8-tap interpolation filter is used in MC. If OBMC is performed after normal MC, (16+7)×(8+7)+(16+7)×(2+7)=552 reference pixels per reference list are required for generating the current PU and related OBMC regions. If the OBMC operations are combined with normal MC into one stage, only (16+7)×(8+2+7)=391 reference pixels per reference list are required for the current PU and related OBMC.

There are two different implementation schemes for integrating OBMC in normal MC: pre-generation and on-the-fly. The first scheme is pre-generating OBMC regions and storing OBMC predictors of the OBMC regions in a local buffer for neighboring blocks when processing a current block by OBMC. The corresponding OBMC predictors are therefore available in the local buffer at the time of processing the neighboring block. FIG. 8A illustrates a reference block fetched for generating a predictor for a current block without generating OBMC regions. FIG. 8B illustrates a reference block fetched for generating a predictor for a current block as well as OBMC regions. The reference block is located according to the motion vector of the current block (MV1 in FIG. 8A and FIG. 8B). In this example, the size of the current block is W×H, 8-tap interpolation filter is used for motion compensation, a width of a right OBMC region is W', and a height of a bottom OBMC region is H'. An example of W' is four pixels and H' is also four pixels, in this case, four additional columns are fetched to generate the right OBMC region and four additional rows are fetched to generate the bottom OBMC region. The number of reference samples in the reference block as shown in FIG. 8A needs to be fetched from memory is (3+W+4)×(3+H+4). The number of reference samples in the reference block as shown in FIG. 8B fetched from memory for generating the predictors for the current block and the two OBMC regions increases to (3+W+W'+4)×(3+H+H'+4). The right OBMC region and the bottom OBMC region are stored in buffers for the OBMC process of right and bottom neighboring blocks. Additional line buffers across Coding Tree Units (CTUs) are required to store the MC results of the bottom OBMC region. The second implementation scheme generates OBMC regions for a current block just before blending OBMC predictors and an original predictor of the current block. For example, when applying OBMC on a current sub-block, OBMC predictors are not yet available in the local buffer, so an original predictor is derived according to the MV of the current sub-block, one or more OBMC predictors are also derived according to MVs of one or more neighboring blocks, and then the original predictor is blended with the one or more OBMC predictors.

BRIEF SUMMARY OF THE INVENTION

Exemplary methods of video processing in a video coding system perform overlapped sub-block motion compensation. An exemplary video processing method receives input video data associated with a current block in a current picture, partitions the current block into multiple overlapped sub-blocks according to an overlapped sub-block partition, and determines one or more sub-block MVs for each sub-block. Each sub-block in the current block is overlapped with one or more other sub-blocks in a horizontal direction, a vertical direction, or both the horizontal and vertical directions according to the overlapped sub-block partition. A selection of the overlapped sub-block partition is either predefined, explicitly signaled at a sequence level, picture level, tile group level, or slice level in a video bitstream, or implicitly decided according to motion information, a sub-block size, or a prediction mode of the current block. The exemplary video processing method derives an initial predictor for each sub-block in the current block by motion compensation using the one or more sub-block MVs. In some embodiments, the current block only contains overlapped regions, and in some other embodiments, the current block contains both overlapped regions and non-overlapped regions. A final predictor for each overlapped region is derived by blending the initial predictors of the overlapped region. For the non-overlapped regions, the initial predictors are used as there is only one initial predictor associated with each non-overlapped region. The current block is encoded or decoded based on the final predictors of the overlapped regions and the initial predictors of the non-overlapped region if available.

In some embodiments, the final predictor is derived by blending the initial predictors of the overlapped region using weighted sum. Weighting factors for the initial predictors may be position dependent or may be depending on a number of overlapped sub-blocks.

Some exemplary video processing methods for processing blocks with Overlapped Block Motion Compensation (OBMC) in a video coding system receive input video data associated with a current block in a current picture, determine one or more MVs, for example one MV for uni-prediction or two MVs for bi-prediction, generate one or more converted MVs by changing the one or more MVs to one or more integer MVs or changing a MV component of the one or more MV to an integer component, and derive an OBMC region by motion compensation using the one or more converted MVs. The exemplary video processing methods apply OBMC by blending an OBMC predictor in the OBMC region with an original predictor, and encode or decoding the current block.

A first OBMC implementation scheme pre-generates at least one OBMC region for at least one neighboring block when processing the current block, so the OBMC region is derived from the converted MV(s) generated from one or more current MVs of the current block. In some embodiments, the converted MV(s) is used to pre-generate a right or bottom OBMC region for a right or bottom neighboring block of the current block, and an OBMC predictor in the OBMC region is blended with the original predictor of the right or bottom neighboring block when processing the right or bottom neighboring block. The converted MV(s) may be used to pre-generate both the right and bottom OBMC regions for the right and bottom neighboring blocks according to an embodiment. In another embodiment, for deriving the right OBMC region for the right neighboring block, the converted MV(s) is generated by changing a horizontal component of the MV(s) of the current block to an integer. Similarly, for deriving the bottom OBMC region for the bottom neighboring block, the converted MV(s) is generated by changing a vertical component of the MV(s) of the current block to an integer.

In some other embodiments, the OBMC region is derived using a converted MV(s) or an original MV(s) depending on the prediction direction of the current block, neighboring block, or both. For example, the OBMC region is derived by motion compensation using the converted MV(s) if the prediction direction of the current block is bi-prediction, otherwise the OBMC region is derived using the MV(s) without conversion if the current block is uni-predicted. In another example, the OBMC region is derived by motion compensation using the converted MV(s) if either the current block or neighboring block is bi-predicted, otherwise the OBMC region is derived using the MV(s) without conversion if both the current block and neighboring block are uni-predicted. Pre-generation of the OBMC region may be adaptive according to one or more criterion in some embodiments. In one embodiment, the OBMC region is pre-generated only when both horizontal and vertical components of the MV(s) of the current block are not integers, or in another embodiment, the OBMC region is pre-generated only when one of the horizontal and vertical components of the MV(s) of the current block is not an integer. In yet another embodiment, the OBMC region is pre-generated only when a predefined component of the MV(s) of the current block is not an integer, and the predefined component depends on whether the OBMC region is for the right or bottom neighboring block. In yet another embodiment, the OBMC region is pre-generated by one of List 0 and List 1 MVs when the current block is bi-predicted with one integer MV and one fractional MV, and the OBMC region is pre-generated by the converted MV generated from the fractional MV. Horizontal and vertical components of the fractional MV are both fractional or only a predefined component of the fractional MV is fractional. A weighting factor for the OBMC predictor in the pre-generated OBMC region is reduced when blending the OBMC predictor with the original predictor of the right or bottom neighboring block. For example, the weighting factor is reduced to half of an original weighting factor, where the original weighting factor is used for an OBMC predictor in a pre-generated OBMC region when the current block is not bi-predicted with one integer MV and one fractional MV.

A second OBMC implementation scheme generates both the OBMC predictor in the OBMC region and an original predictor for the current block at the time of processing the current block. The OBMC region is derived from the converted MV(s) generated from one or more neighboring MVs of a neighboring block, the OBMC region is derived for the current block, and the OBMC region is blended with the original predictor of the current block. Some embodiments of the second OBMC implementation scheme derive the OBMC region using the converted MV(s) if a prediction direction of a neighboring block is bi-prediction, or using the MV(s) without conversion if the prediction direction of the neighboring block is uni-prediction. Some other embodiments derive the OBMC region using the converted MV(s) if the current block or neighboring block is bi-predicted, or using the MV(s) without conversion if both the current block and neighboring block are un-predicted. In yet another embodiment, the OBMC region is derived using the converted MV(s) only if the current block is bi-predicted with integer MVs and the neighboring block is bi-predicted.

Some examples of changing the MV(s) to integer MV(s) are truncating or rounding into integer MV(s). In some exemplary embodiments, the method checks a similarity of MVs of the current block and a neighboring block, and adaptively skips blending the OBMC predictor in the OBMC region with the original predictor according to the similarity of the MVs. The MV similarity checking may be performed before or after generating the converted MV(s).

In a variation of the video processing method, an embodiment sets a maximum number of OBMC blending lines in the OBMC region to 3 when the current block is luminance (luma) block, and sets a maximum number of OBMC blending lines to 1 or 2 when the current block is a chrominance (chroma) block. Another embodiment of the video processing method sets a number of OBMC blending lines in the OBMC region for a luma component to 3 if a fractional part of an absolute value of the MV(s) is larger than 0.5 or is larger than or equal to 0.5, otherwise sets the number of OBMC blending lines in the OBMC region for the luma component to 4. An embodiment of the video processing method sets a number of OBMC blending lines in the OBMC region for chroma components to 1 if a fractional part of an absolute value of the MV(s) is larger than 0.5 or is larger than or equal to 0.5, otherwise sets the number of OBMC blending lines in the OBMC region for the chroma components to 2. In yet another embodiment of the video processing method sets a number of OBMC blending lines in the OBMC region for chroma components to 1 if the number of OBMC blending lines in the OBMC region for the luma component is reduced to 3, otherwise sets the number of OBMC blending lines in the OBMC region for the chroma components to 2. In yet another embodiment, when the OBMC region is derived by the converted MV(s) of a top neighboring block, a number of OBMC blending lines in the OBMC region for a luma component is 3 only if a fractional part of an absolute value of the MV(s) in a vertical direction is larger than 0.5 or is larger than or equal to 0.5; otherwise, the number of OBMC blending lines for the luma component is 4. When the OBMC region is derived by the converted MV(s) of a left neighboring block, a number of OBMC blending lines in the OBMC region for a luma component is 3 only if a fractional part of an absolute value of the MV(s) in a horizontal direction is larger than 0.5 or is larger than or equal to 0.5, otherwise the number of OBMC blending lines for the luma component is 4. Similarly, when the OBMC region is derived by the converted MV(s) of a top neighboring block, a number of OBMC blending lines in the OBMC region for chroma components is 1 only if a fractional part of an absolute value of the MV(s) in a vertical direction is larger than 0.5 or is larger than or equal to 0.5, or the number of OBMC blending lines for the luma components is reduced to 3; otherwise, the number of OBMC blending lines for the chroma components is 2. When the OBMC region is derived by the converted MV(s) of a left neighboring block, a number of OBMC blending lines in the OBMC region for chroma components is 1 only if a fractional part of an absolute value of the MV(s) in a horizontal direction is larger than 0.5 or is larger than or equal to 0.5, or the number of OBMC blending lines for the luma components is reduced to 3, otherwise the number of OBMC blending lines for the chroma components is 2.

Some embodiments of applying OBMC adaptively determine a number of OBMC blending lines for blending an original predictor with an OBMC predictor of a current block. In one embodiment, the number of OBMC blending lines for a left boundary of a current block is determined according to a width of the current block, and/or the number of OBMC blending lines for a top boundary of the current block is determined according to a height of the current block. The original predictor of the current block is derived by motion compensation using one or more current MVs of the current block. The OBMC predictor of a left OBMC region having the number of OBMC blending lines for the left boundary is derived by motion compensation using one or more MVs of a left neighboring block of the current block. The OBMC predictor of a top OBMC region having the number of OBMC blending lines for the top boundary is derived by motion compensation using one or more MVs of a top neighboring block of the current block. The video encoding or decoding system applies OBMC to the current block by blending the OMBC predictor with the original predictor of the current block for the number of OBMC blending lines, and encodes or decodes the current block. For example, the width of a luma block is compared with a predefined threshold to decide 2 OBMC blending lines or 4 OBMC blending lines are used at the left boundary of the current block. The height of the luma block is compared with a predefined threshold to decide 2 OBMC blending lines or 4 OBMC blending lines are used at the top boundary of the current block. Less OBMC blending lines for the left or top boundary are used for blocks with a width or length shorter than the predefined threshold. Similarly, the width of a chroma block may be used to decide the number of OBMC blending lines, for example, 1 OBMC blending line is used at the left boundary if the width of the chroma block is less than a predefined threshold, otherwise 2 OBMC blending lines are used; and/or 1 OBMC blending line is used at the top boundary if the width of the chroma block is less than a predefined threshold, otherwise 2 OBMC blending lines are used. The number of OBMC blending lines may be adaptively determined according to a length of an interpolation filter used in motion compensation, for example, more OBMC blending lines are required when a longer interpolation filter is employed.

The methods of adaptively determining the number of OBMC blending lines may be enabled or disabled according to a flag, for example, 4 OBMC blending lines are used for the luma component and 2 OBMC blending lines are used for the chroma components if the flag indicates adaptive number of OBMC blending lines is disabled. In an embodiment, the number of OBMC blending lines for the luma component is adaptively determined according to the width or height of the current block, and the number of OBMC blending lines for chroma components is determined according to the number of OBMC blending lines for the luma component.

Aspects of the disclosure further provide embodiments of apparatus of processing video data in a video coding system. An embodiment of the apparatus comprises one or more electronic circuits configured for receiving input data of a current block in a current picture, partitioning the current block into multiple overlapped sub-blocks according to an overlapped sub-block partition, determining one or more sub-block MVs for each sub-block; deriving an initial predictor for each sub-block by motion compensation using the one or more sub-block MVs, deriving a final predictor for each overlapped region by blending the initial predictors of the overlapped region, and encoding or decoding the current block based on the final predictors. Another embodiment of the apparatus comprises one or more electronic circuits configured for receiving input video data of a current block, determining one or more MVs, generating one or more converted MVs by changing the one or more MVs to one or more integer MVs or changing a MV component of the one or more MVs to an integer component, deriving an OBMC region by motion compensation using the one or more converted MVs, applying OBMC by blending an OBMC predictor in the OBMC region with an original predictor, and encoding or decoding the current block.

Aspects of the disclosure further provide a non-transitory computer readable medium storing program instructions for causing a processing circuit of an apparatus to perform a video processing method to encode or decode a current block utilizing overlapped sub-blocks according to some embodiments, or encode or decode a current block with OBMC and an OBMC region is derived using an integer MV according to some other embodiments.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein:

FIG. 5 illustrates an example of determining a Merge candidate for a CU with four sub-blocks according to the STMVP technique.

FIG. 6A illustrates an example of applying affine motion compensation prediction on a current block with two control points.

FIG. 6B illustrates an example of applying block based affine motion compensation prediction with two control points.

FIG. 9A illustrates an exemplary non-overlapped sub-block partition.

FIG. 9B illustrates an exemplary overlapped sub-block partition with overlapped regions located in a horizontal direction.

FIG. 9C illustrates an exemplary overlapped sub-block partition with overlapped regions located in a vertical direction.

FIG. 9D illustrates an exemplary overlapped sub-block partition with overlapped regions located in both horizontal and vertical directions.

DETAILED DESCRIPTION OF THE INVENTION

Figure 13:
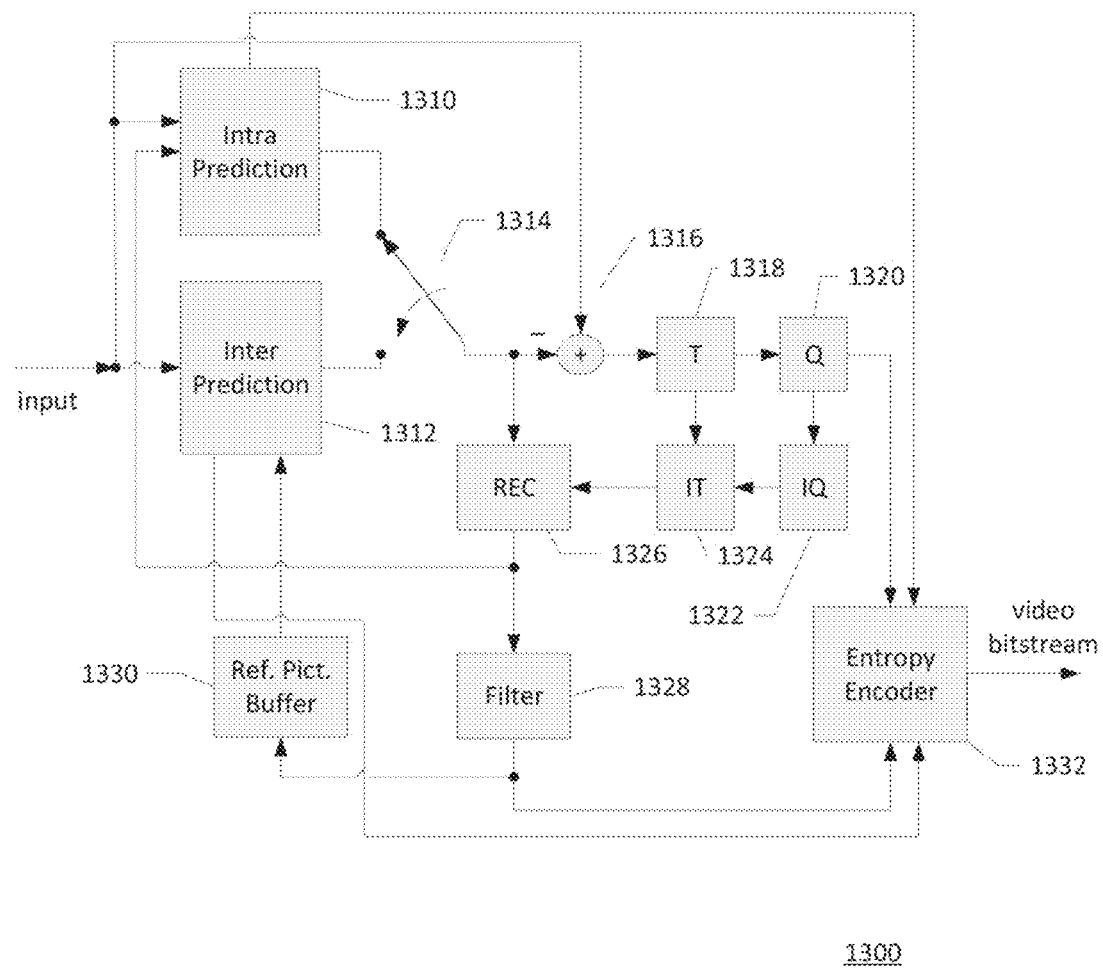
FIG. 13 illustrates an exemplary system block diagram for a video encoding system incorporating the video processing method according to embodiments of the present invention.
Figure 14:
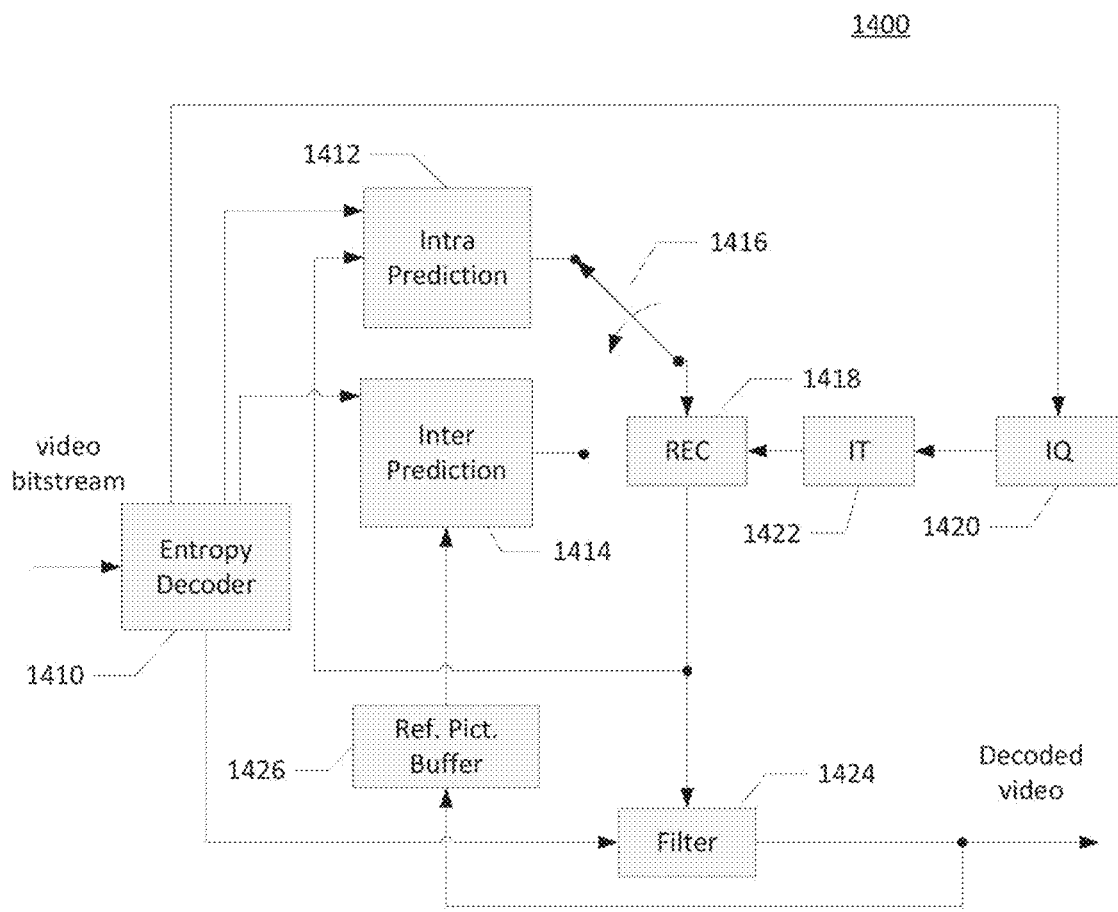
FIG. 14 illustrates an exemplary system block diagram for a video decoding system incorporating the video processing method according to embodiments of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. In this disclosure, systems and methods are described for motion compensation with an overlapped sub-block partition or Overlapped Block Motion Compensation (OBMC), and each or a combination of the methods may be implemented in a video encoder or video decoder. An exemplary video encoder and decoder implementing one or a combination of the methods are illustrated in FIGS. 13 and 14 respectively. Various embodiments in the disclosure reduce the computation complexity, especially for the interpolation filtering applied in motion compensation, and reduce additional bandwidth required by OBMC in one or both the OBMC implementation schemes. Systems and methods described herein are organized in sections as follows. The section "Overlapped Sub-block Partition" demonstrates exemplary methods of overlapped sub-block motion compensation which achieves a similar effect of reducing artifact as the OBMC technique. The section "Directional OBMC" describes exemplary methods of applying OBMC on only one or more specific directions. The section "Short-tap Interpolation Filter for OBMC regions" describes exemplary methods of employing short-tap interpolation filter when generating one or more OBMC regions. The section "Use Integer MVs for Generating OBMC Regions", followed by the sections "Conditionally Changing to Integer MV", "Conditionally Pre-generating OBMC Regions", "Conditionally Skip OBMC Blending", "Conditionally Generating OBMC Regions", and "Reduce Blending Lines for OBMC" describe various exemplary methods of converting a MV or a MV component to an integer MV or an integer MV component when generating an OBMC region. The section "Adaptive number of OBMC blending lines" illustrates exemplary methods of generating OBMC regions with a number of OBMC blending lines adaptively determined. The section "Exemplary Flowchart" describes exemplary methods of generating an OBMC region using one or more converted MVs, where the converted MVs are integer MVs or MVs with an integer component. The sections "OBMC Interacts with BiCW" and "OBMC Interacts with BDOF" describe some examples of implementation of OBMC together with the Bi-prediction with CU weights (BiCW) technique and BDOF technique. The section "Video Encoder and Decoder Implementation" together with FIGS. 13 and 14 illustrate a video encoding system and a video decoding system incorporating one or a combination of the described video processing methods.

Overlapped Sub-block Partition In order to reduce the computational complexity of applying OBMC, affine prediction mode, or other sub-block-based prediction modes on non-overlapped sub-blocks, embodiments of the present invention apply overlapped sub-blocks motion compensation instead of OBMC. FIG. 9A illustrates an example of partitioning a CU into 16 non-overlapped sub-blocks. FIG. 9B illustrates an example of partitioning a CU into 6 overlapped sub-blocks and 9C illustrates another example of partitioning a CU into 6 overlapped sub-blocks. In the example of FIG. 9B, sub-block 0 is partially overlapped with sub-block 1, sub-block 1 is partially overlapped with sub-block 2, sub-block 3 is partially overlapped with sub-block 4, and sub-block 4 is partially overlapped with sub-block 5. The overlapped sub-blocks in FIG. 9B only have overlapped regions located at the right and/or left boundary of each sub-block. The video encoder or decoder derives an initial predictor for each sub-block of sub-blocks 0, 1, 2, 3, 4, 5 according to one or more corresponding MVs of the sub-block, and then the video encoder or decoder derives a final predictor for the CU by blending or combining the six initial predictors. For example, the initial predictor of the left part of sub-block 1 is blended with the initial predictor of the right part of sub-block 0, and the initial predictor of the right part of sub-block 1 is blended with the initial predictor of the left part of sub-block 2. The initial predictor of each non-overlapped region is the final predictor for the non-overlapped region, for example, the initial predictor of the left part of sub-block 0 is also the final predictor for the left part of sub-block 0.

In FIG. 9C, sub-block 0 is partially overlapped with sub-block 2, sub-block 2 is partially overlapped with sub-block 4, sub-block 1 is partially overlapped with sub-block 3, and sub-block 3 is partially overlapped with sub-block 5. The overlapped sub-blocks in FIG. 9C only have overlapped regions located at the top and/or bottom boundary of each sub-block. An initial predictor is derived for each sub-block, and the initial predictor of the top part of sub-block 2 is blended with the initial predictor of the bottom part of sub-block 0, and the initial predictor of the bottom part of sub-block 2 is blended with the initial predictor of the top part of sub-block 4. Similarly, the initial predictor of the top part of sub-block 3 is blended with the initial predictor of the bottom part of sub-block 1, and the initial predictor of the bottom part of sub-block 3 is blended with the initial predictor of the top part of sub-block 5.

In some other embodiments, the overlapped regions are located at the top boundary, bottom boundary, left boundary, and right boundary, an example is shown in FIG. 9D. As shown in FIG. 9D, a CU is first partitioned into 16 sub-blocks and one or more corresponding MVs are derived for each sub-block. A first initial predictor is located according to one or two corresponding MVs for each sub-block of the 16 sub-block partition. The same CU is also partitioned into 25 sub-blocks, and each of the 25 sub-blocks is overlapped with one or more sub-blocks of the 16 sub-blocks in both horizontal and vertical directions. New MVs are derived for the 25 sub-blocks for locating second initial predictors. Each pixel of a final predictor for an overlapped region is calculated by blending or combining the pixel values of the two corresponding initial predictors, where one predictor is a first initial predictor derived by the 16 sub-block partition and another predictor is a second initial predictor derived by the 25 sub-block partition.

The overlapped sub-block partition for splitting a block may be explicitly signalled, implicitly decided, or pre-defined. For example, a selection of the overlapped sub-block partition is signalled at a sequence level, picture level, tile group level or slice level of a video bitstream. An example of implicitly decision determines the overlapped sub-block partition according to one or a combination of motion information of the current block, the size of sub-blocks, or prediction mode of the current block. Initial predictors generated by the overlapped sub-blocks in the current block may be combined or blended using weighted sum to generate a final predictor for the current block. The weights used to generate the final predictor in the overlapped region can be position-dependent according to one embodiment, or each weight of the initial predictor depends on a number of overlapped sub-blocks according to another embodiment.

Figures 1, 2A, 2B:
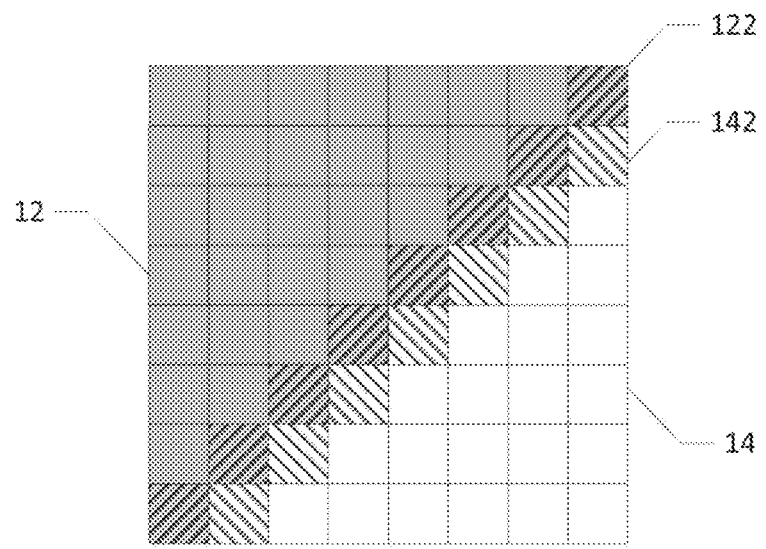
FIG. 1 illustrates an example of overlapped motion compensation for a geometry partition.
FIGS. 2A and 2B illustrate examples of OBMC footprint for 2N×N block and N×2N block with different weightings for boundary pixels.
Figure 3:
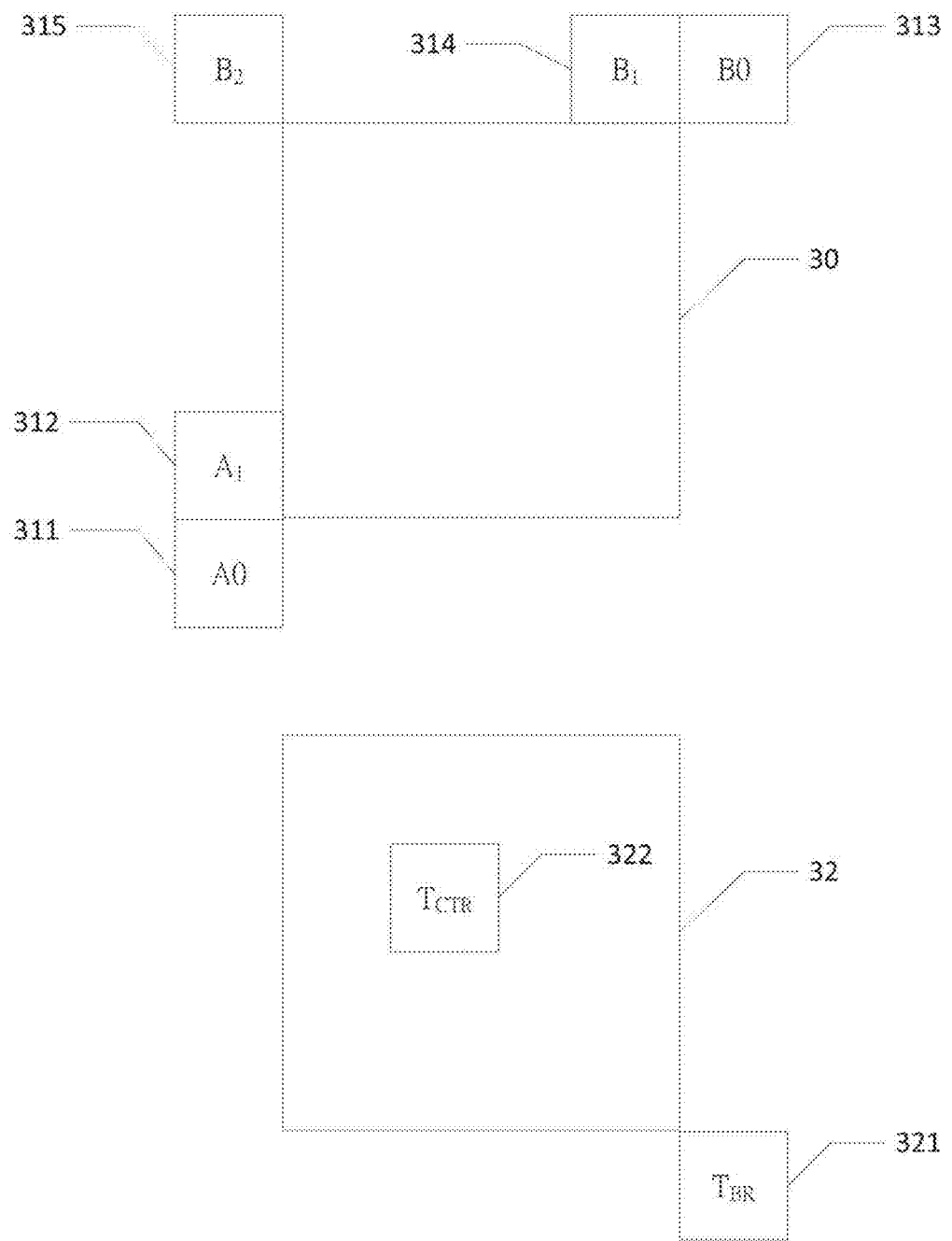
FIG. 3 illustrates positions of spatial and temporal MV candidates for constructing a Merge candidate set.
Figure 4:
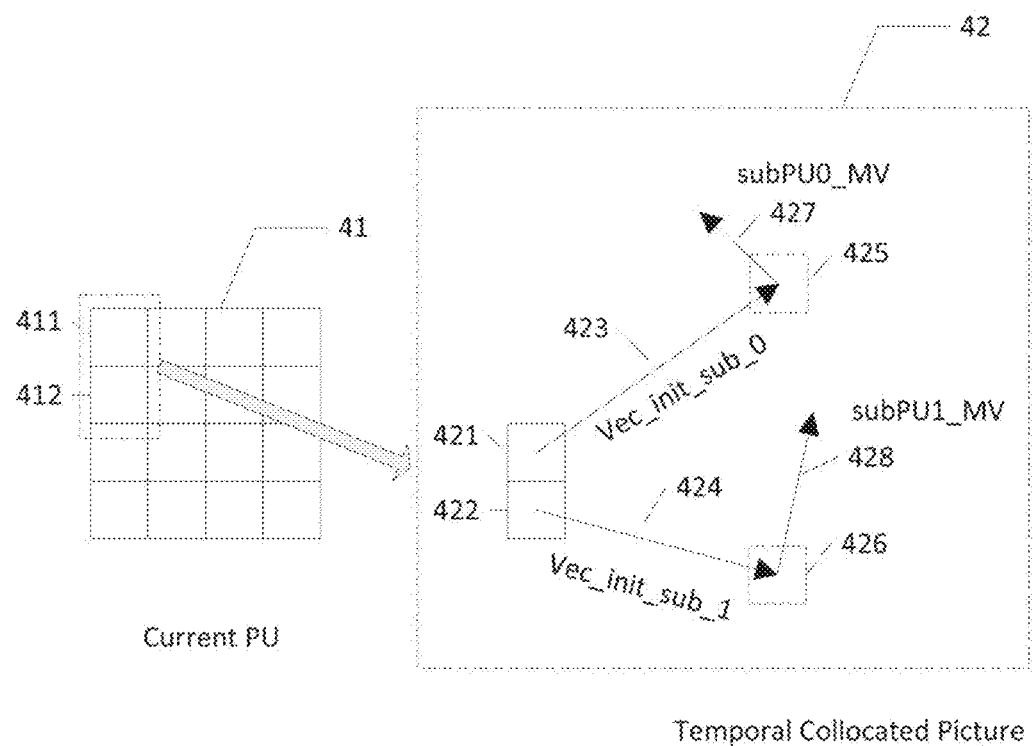
FIG. 4 illustrates an example of determining sub-block motion vectors for sub-blocks in a current PU according to the SbTMVP technique.
Figure 7A:
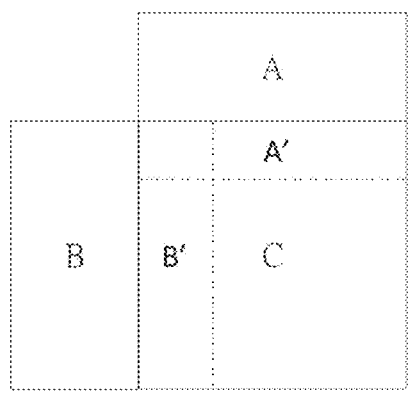
FIG. 7A illustrates an example of applying OBMC to a block without sub-block motion compensation mode.
Figure 7B:
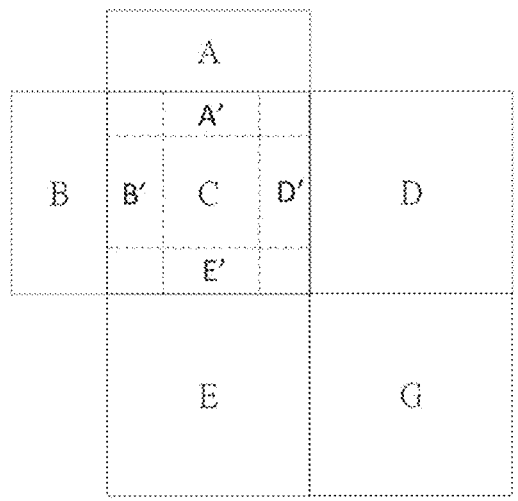
FIG. 7B illustrates an example of applying OBMC to a block with sub-block motion compensation mode.
Figure 8A:
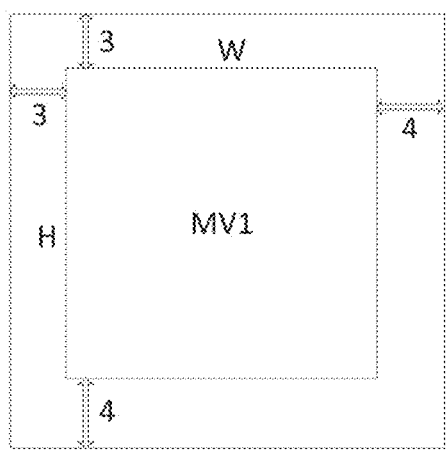
FIG. 8A illustrates an example of a reference block fetched from the memory for generating a predictor for a current block.
Figure 8B:
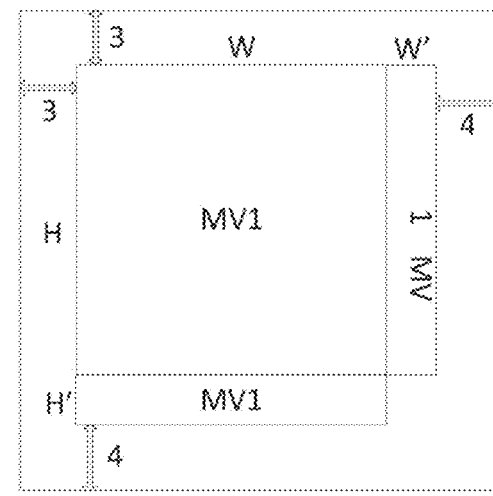
FIG. 8B illustrates an example of a reference block fetched form the memory for generating a predictor for a current block and two OBMC predictors for neighboring blocks.
Figure 10:
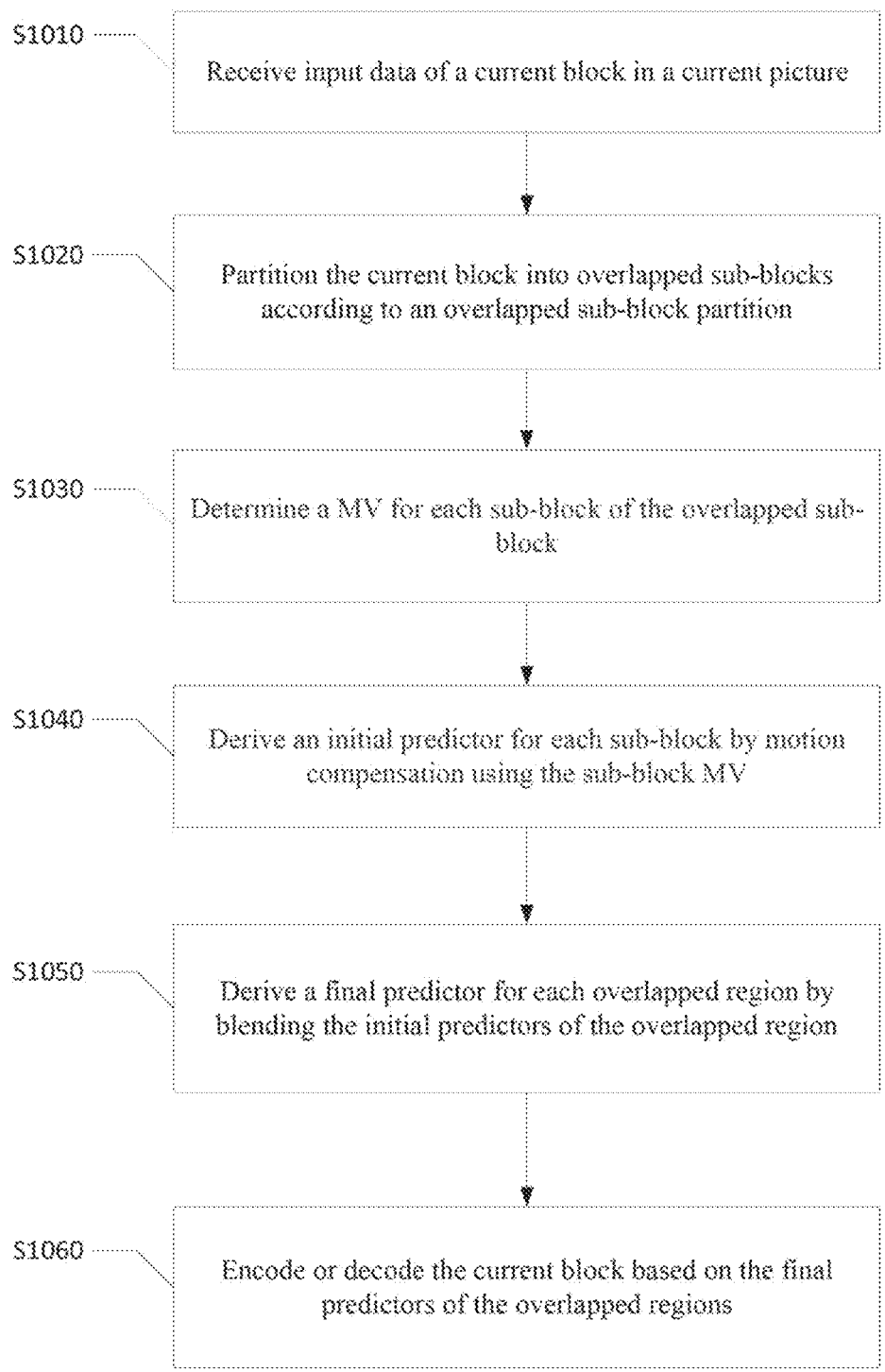
FIG. 10 is a flowchart shows an exemplary embodiment of process a current block with overlapped sub-block motion compensation.

Exemplary Flowchart FIG. 10 illustrates an exemplary flowchart of a video encoding or decoding system processing video data by overlapped sub-block motion compensation. The video encoding or decoding system receives input video data associated with a current block in a current picture in Step S1010. At the encoder side, the input video data corresponds to pixel data to be encoded. At the decoder side, the input data corresponds to coded data or prediction residual to be decoded. In Step S1020, the video encoding or decoding system partitions the current block into overlapped sub-blocks according to an overlapped sub-block partition. Each sub-block in the current block is overlapped with one or more other sub-blocks at the left and/or right boundary, at the top and/or bottom boundary, or at one or a combination of the left, right, top, and bottom boundaries. The overlapped sub-block partition may be predefined, explicitly signaled in a sequence level, picture level, tile group level or slice level in a video bitstream, or implicitly decided according to one or a combination of the motion information, sub-block size, and prediction mode of the current block. A sub-block MV is determined for each overlapped sub-block if the sub-block is predicted in uni-prediction, List 0 and List 1 sub-block MVs are determined for each overlapped sub-block if the sub-block is predicted in bi-prediction in Step S1030. Each overlapped sub-block in the current block is motion compensated by the sub-block MV(s) to derive an initial predictor from a reference picture in Step S1040. The video encoding or decoding system then derives a final predictor for each overlapped region by blending the initial predictors of the overlapped region in Step S1050. There may be non-overlapped regions as well as the overlapped regions in the current block, or there are only overlapped regions in the current block according to various overlapped sub-block partitions. In Step S1060, the video encoding or decoding system encodes or decodes the current block based on the final predictors of the overlapped regions. If there are also non-overlapped regions in the current block, the video encoding or decoding system encodes or decodes the current block based on the final predictors of the overlapped regions and the initial predictors of the non-overlapped regions.

Directional OBMC For a CU coded in sub-block mode, conventional OBMC is applied to each sub-block in four directions. Some embodiments of the directional OBMC reduce the number of directions in the OBMC sub-block process. For example, only the OBMC predictor generated from a left block is used to combine with an original predictor of a current sub-block. In another embodiment, only the OBMC predictor generated from an above block is used. The selected direction/directions for applying the OBMC process may be implicitly derived or explicitly signalled. An example of implicitly selecting the OBMC direction decides the direction based on motion information of the current block and neighboring blocks. The motion information include one or a combination of motion vector, reference frame index, prediction direction, prediction mode, CU size, and sub-block size. In one embodiment, the direction of applying OBMC is selected based on the magnitude of Motion Vector Differences (MVD) between the current block and neighboring blocks. The direction with a larger MVD between the current block and the neighboring block is selected. In another embodiment, the direction with a smaller but nonzero MVD is selected. In one embodiment, the direction with a smaller average CU size of neighboring blocks is selected. The selection may be explicitly signalled to the decoder at a sequence level, picture level, CTU level, CU level, or block level. The current block and the neighboring block here may be either a current block or a current sub-block and a neighboring block or a neighboring sub-block respectively.

Short-tap Interpolation Filter for OBMC regions In order to reduce the computation complexity of the OBMC process, the interpolation filter length of the interpolation filter used in motion compensation of the OBMC process may be reduced. The length of the interpolation filter used in the OBMC process is shorter than the length of the interpolation filter used in the normal MC process. Conventionally, an 8-tap interpolation filter is used for luma samples and a 4-tap interpolation filter is used for chroma samples in the normal MC process, an embodiment of the present invention uses a 4-tap interpolation filter for performing OBMC on luma samples and a 2-tap interpolation filter for performing OBMC on chroma samples. In another example, a 1-tap interpolation filter is used for luma samples while a 2-tap interpolation filter is used for chroma samples. In yet another example, a 1-tap interpolation filter is used in the OBMC process for both luma and chroma samples. By reducing the number of interpolation filter taps, the computation complexity of OBMC may be reduced and extra memory bandwidth for OBMC regions is saved in the worst case scenario.

Use Integer MVs for Generating OBMC Regions In the following description, a current block may be a current CU, PU, or sub-block, and a neighboring block may be a neighboring CU, PU, or sub-block. Some embodiments of the present invention only allow integer MVs in the OBMC process to further simplify the computation and reduce the memory bandwidth in motion compensation of the OBMC process. Equivalently, a 1-tap interpolation filter is employed in the OBMC process. Exemplary embodiments determine one or more MVs for generating an OBMC region, generating one or more converted MVs by changing the one or more MVs to one or more integer MVs. The one or more converted MVs of each neighboring block are aligned to integer samples in the on-the-fly OBMC process, or the one or more converted MVs of the current block are aligned to integer samples in the pre-generation OBMC process to avoid fractional motion compensation calculation and accessing additional reference samples in the OBMC process. The one or more converted MVs are used to derive an OBMC region by motion compensation. The OBMC predictor in the OBMC region is blended with an original predictor in the OBMC process. For example, the OBMC predictor is blended with an original predictor of a neighboring block in the pre-generation OBMC process, whereas the OBMC predictor is blended with an original predictor of the current block in the on-the-fly OBMC process.

Some examples of changing a MV into an integer MV for generating OBMC regions include truncating or rounding the MV into an integer MV. For example, a MV is changed by discarding the fractional part of the MV, rounding the MV to a nearest integer, rounding to an integer MV when the rounding offset is equal to 0.5 (e.g. offset=(1<<(shift_bit−1)), where shift bit is the rounding bits), or rounding to an integer MV when the rounding offset is smaller than 0.5 (e.g. offset=(1<<(shift_bit−1)−1). If the distances between the original MV and two integer MVs are the same, a closer to zero integer MV may be selected, or in another example, a closer to infinite integer MV may be selected.

In some embodiments, only the MV of the luma component is converted to an integer MV, and in another embodiment, the MV of the chroma components is also rounded or truncated to an integer MV.

Under the first implementation scheme of pre-generating OBMC regions for neighboring blocks when performing motion compensation on a current block, only the MV(s) in the horizontal direction for deriving a right OBMC region is changed to integer MV(s) according to one embodiment. The horizontal component of the MV is truncated or rounded to an integer value before generating the right OBMC region for a right neighboring block of the current block. That is, only the horizontal component in the MV(s) of the current block is converted to an integer for deriving a right OBMC region. In another embodiment, only the MV(s) in the vertical direction for deriving a bottom OBMC region is changed to integer MV(s). The vertical component of the MV is truncated or rounded to an integer value before generating the bottom OMBC region for a bottom neighboring block. Only the vertical component in the MV(s) of the current block is converted to an integer for deriving a bottom OBMC region. In yet another embodiment, the MV(s) in the horizontal direction for deriving the right OBMC block is changed to integer MV(s) and the MV(s) in the vertical direction for deriving the bottom OBMC region is changed to integer MV(s).

Conditionally Changing to Integer MV In some embodiments, when applying the first implementation scheme, that is pre-generation of OBMC regions, an OBMC region is derived by changing a current MV(s) or a MV component of a current MV(s) into an integer MV(s) or integer if motion information of the current block and/or neighboring blocks satisfies a certain criterion. In the first implementation scheme, each of the OBMC regions generated by motion information of the current block is used to blend with one or more predictors of a neighboring block.

For example, the current MVs of a current block are changed to integer MVs before generating OBMC regions if the prediction direction of the current block is bi-prediction. If the prediction direction of the current block is uni-prediction, the current MV is used to generate OBMC regions for neighboring blocks without conversion. In another example, motion information of a neighboring block is also considered, so the current MV(s) of a current block is converted to an integer MV(s) if the prediction direction of the current block or the neighboring block is bi-prediction. That is the current MV is not converted for generating an OBMC region for a neighboring block only if both the current block and neighboring block are uni-prediction.

When the second implementation scheme is applied, the MV(s) or a MV component of a neighboring block is converted into an integer MV(s) or an integer MV component for generating an OBMC region for the current block if motion information of the neighboring block and/or the current block satisfies a certain criterion. In the second implementation scheme, one or more OBMC regions generated by motion information of one or more neighboring blocks are used to process a current block by blending the one or more OBMC regions with the current predictor. In some embodiments, the MV of the neighboring block is conditionally modified to an integer precision depending on motion information of the neighboring block and/or current block. In one embodiment, the MVs of the neighboring block are changed to integer MVs if the prediction direction of the neighboring block is bi-prediction. For example, when the current block and neighboring block are both predicted by uni-prediction, the MV from the neighboring block is not converted into an integer MV; when the current block is uni-predicted and the neighboring block is bi-predicted, the MVs from the neighboring block are converted to integer MVs; and when current block is bi-predicted with integer MVs and the neighboring block is bi-predicted, the MVs from the neighboring block are converted to integer MVs. In another embodiment, the MV(s) of the neighboring block is converted to an integer MV(s) for generating an OBMC region for the current block if the prediction direction of the current block or neighboring block is bi-prediction. In yet another embodiment, the MV(s) of a neighboring block is converted to an integer MV(s) for generating an OBMC region for a current block only if the current block is bi-predicted with integer MVs and the neighboring block is also bi-predicted.

Conditionally Pre-generating OBMC Regions Some embodiments of the first implementation scheme always convert the MV(s) to an integer MV before generating one or more OBMC regions, however, the one or more OBMC regions for one or more neighboring blocks are conditionally pre-generated. In one embodiment, right OBMC and bottom OBMC regions are pre-generated only when MV components of a current MV(s) are not integer in both horizontal and vertical directions, and if the MV components of the current MV(s) are not integers in both directions, the current MV(s) is changed to an integer MV(s) for generating OBMC regions. In this embodiment, the MV components of the current block are first checked before pre-generating a right OBMC region for a right neighboring block, if one of the MV components in horizontal and vertical directions is an integer, the right OBMC region will not be pre-generated. Similarly, the MV components are checked before pre-generating a bottom OBMC region, if one of the MV components in horizontal and vertical directions is an integer, the bottom OBMC region will not be pre-generated. In another embodiment, the right and bottom OBMC regions are pre-generated when a MV component of the current MV in either horizontal or vertical direction is not an integer. When the MV component in the horizontal or vertical direction is not integer, OBMC regions are pre-generated by changing the MV component or the current MV(s) to an integer or an integer MV(s). In this embodiment, the current MV(s) of the current block is first checked, and the right OBMC region is not pre-generated if both the MV components in horizontal and vertical directions are integers. Similarly, the bottom OBMC region is not generated if both the MV components in horizontal and vertical directions are integers.

Another embodiment of conditionally pre-generating an OBMC region checks the current MV in a predefined direction for a right or bottom OBMC region, and changes the current MV to an integer MV when the current MV in the predefined direction is not an integer. For example, the right OBMC region is generated only when a horizontal component of the MV is not an integer, and the horizontal MV component or MV components in all directions are changed to integers when generating the right OBMC region. In another example, the bottom OBMC region is generated only when the vertical component of the MV is not an integer, and the vertical MV component or all MV components are changed to integers when generating the bottom OBMC region. In yet another example, each of the right and bottom OBMC regions is generated only when the MV component in the horizontal and vertical direction is not an integer respectively. When generating the right or bottom OBMC region, the corresponding MV component or the MV is changed to an integer or an integer MV for generating the right or bottom OBMC region.

In some embodiments, the current block is bi-predicted and only one of the MVs in List 0 and List 1 is an integer MV in both horizontal and vertical directions while the other MV is a fractional MV in at least one direction, or only one of the MVs in List 0 and List 1 has an integer MV component in a predefined direction while the other MV has a fractional MV component in the predefined direction. The OBMC regions will be pre-generated using the fractional MV by changing the fractional MV into an integer MV, or the OBMC regions will be pre-generated using the fractional MV component in the predefined direction by changing the fractional MV component to an integer or changing all MV components to integers. For example, the prediction direction for a current block is bi-prediction, and the MV in List 0 is an integer MV in both horizontal and vertical directions while the MV in List 1 is not an integer MV in both the directions. The MV in List 1 is selected and changed to an integer MV for generating OBMC regions. When one of these OBMC regions is used by a neighboring block, it is blended with an original predictor derived according to motion information of the neighboring block, and the weighting factor for the OBMC predictor of the OBMC region may be reduced, for example, the weighting factor may be decreased to half of an original weighting factor. In another example, only one of the current MVs in List 0 and List 1 has an integer MV component in the horizontal direction, a right OBMC region is generated using the MV with a fractional MV component in the horizontal direction. The MV is changed to have an integer MV component in the horizontal direction or is changed to have integer MV components in both directions before generating the right OBMC region. When the OBMC predictor of this right OBMC region is blended with another predictor, the weight factor for the OBMC predictor may be lower than the original weighting factor, for example, the weighting factor is decreased to half of the original weighting factor. For generating a bottom OBMC region according to bi-predicted motion information of a current block, if only one of the MVs in List 0 and List 1 has an integer MV component in the vertical direction, the bottom OBMC region is generated using the MV that has a fractional MV component in the vertical direction. The MV is changed to an integer MV component in the vertical direction or integer MV components in both directions before generating the bottom OBMC region. The weighting factor for the OBMC predictor of this kind of bottom OBMC region may be lowered, for example, decreased to half of the original weighting factor for the normal bottom OBMC region.

Conditionally Skip OBMC Blending In some embodiments, OBMC blending depends on a similarity of MVs of a current block and neighboring block. For example, the MVs are checked by calculating a MV difference between the MVs of the current block and neighboring block and comparing with a predefined threshold. OBMC blending between the current block and neighboring block is skipped if the MV difference is larger than the predefined threshold. In one embodiment, the MV similarity checking is performed before changing the MV for generating an OBMC region to an integer MV. In another embodiment, the MV similarity checking is performed after changing the MV for generating an OBMC region to an integer MV. The MV for generating an OBMC region is the MV of the current block in the first implementation scheme, and the MV for generating an OBMC region is the MV of the neighboring block in the second implementation scheme. In yet another embodiment, skip OBMC blending according to the MV similarity is disabled, and the MV(s) is changed to an integer MV before generating an OBMC region.

Conditionally Generating OBMC Regions In some embodiments of the first implementation scheme, OBMC regions are generated only if a size, width, or height of a current block is larger than or equal to a predefined threshold. Some examples of the predefined threshold for the size is 16, 32, 64, 128, 256, 512, 1024, 2048, 4096, 8192, and 16384. For example, the OBMC regions are generated only if a current block has a size larger than or equal to 64. In one embodiment, OBMC regions are generated only if the width of a current block is larger than or equal to a first predefined threshold, and the height of the current block is larger than or equal to a second predefined threshold. Some examples of a combination of the first and second predefined thresholds are (4, 4), (4, 8), (4, 16), (4, 32), (4, 64), (4, 128), (8, 4), (8, 8), (8, 16), (8, 32), (8, 64), (8, 128), (16, 4), (16, 8), (16, 16), (16, 32), (16, 64), (16, 128), (32, 4), (32, 8), (32, 16), (32, 32), (32, 64), (32, 128), (64, 4), (64, 8), (4, 16), (64, 32), (64, 64), (64, 128), (128, 4), (128, 8), (128, 16), (128, 32), (128, 64), and (128, 128). For example, OBMC regions are generated only if the width of a current block is larger than or equal to 8 and the height is larger than or equal to 16.

In some embodiments of the second implementation scheme, the constraints for deciding whether OBMC regions are generated are applied to one or more neighboring blocks. For example, the OBMC regions are generated only if a width of a neighboring block is larger than or equal to 8 and a height of the neighboring block is larger than or equal to 16.

The conditionally OBMC region generation methods may only apply to luma components, or may apply to both luma and chroma components.

Figure 11:
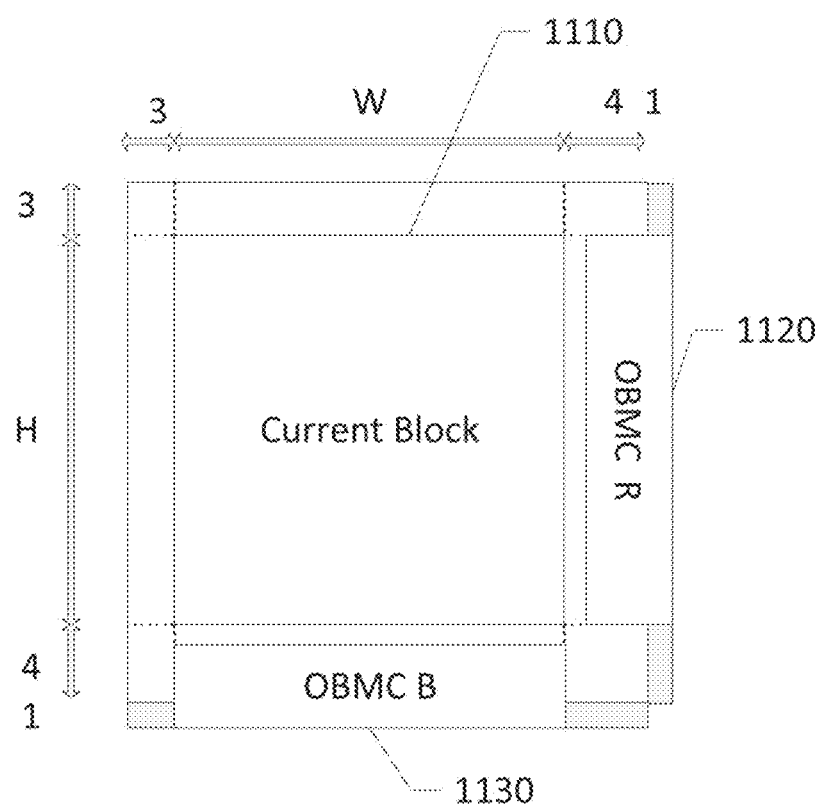
FIG. 11 illustrates an example of a reference block fetched from the memory for generating a predictor for a current block and two OBMC predictors for neighboring blocks when a current MV is rounded up to an integer MV for generating the OBMC predictors.

Reduce Blending Lines for OBMC The number of blending lines for OBMC is the number of pixels in the horizontal direction in a right OBMC region or the number of pixels in the vertical direction in a bottom OBMC region. The number of blending lines for OBMC is also defined as the number of rows of pixels on the horizontal boundary or the number of columns of pixels on the vertical boundary processed by OBMC blending. In some embodiments of converting a fractional MV to an integer MV, the fractional MV is rounded up to the integer MV when the fractional part is larger than 0.5, or when the fractional part is larger than or equal to 0.5. FIG. 11 illustrates an example of fetching reference samples for a current block and two OBMC regions from a reference picture. The size of the current block is W×H, and the number of blending lines for OBMC is 4 in this example. The OBMC predictors (OBMC R 1120 and OBMC B 1130) for the right and bottom OBMC regions have a 1-pixel gap from a current predictor 1110 for the current block in the reference picture because the fractional current MV is rounded up to an integer MV. In this case, a larger reference block (W+8)×(H+8), rather than (W+7)×(H+7), is required for fetching the reference samples for the current block and the two OBMC regions. In order to keep the maximum reference block size for fetching reference pixels for the current block and OBMC regions within a range, the OBMC process may only blend 3 lines of pixels at the block boundary instead of 4 lines. An embodiment reduces a maximum number of OBMC blending lines so the worst case bandwidth will not increase by rounding up a MV to an integer MV when pre-generating OBMC regions by the integer MV. For example, a maximum number of OBMC blending lines for the luma component is reduced from 4 to 3. A maximum number of OBMC blending lines for the chroma components is reduced from 2 to 1 according to one embodiment, or remained as 2 according to another embodiment. In one embodiment, the maximum numbers of blending lines for the luma and chroma components are reduced from 4 to 3 and from 2 to 1 respectively.

Some other embodiments decide the number of OBMC blending lines for each block according to one or more predefined criterion. Exemplary systems determine the number of OBMC blending lines according to the MV used for generating one or more OBMC regions. For example, an exemplary system checks if the fractional part of an absolute value of the MV in list 0 or list 1 is larger than 0.5, and reduces the number of OBMC blending lines for the luma component from 4 to 3 only if the fractional part is larger than 0.5. The number of blending lines remains as 4 if the MV is an integer MV or if the fractional part is less than or equal to 0.5. In an embodiment considering both luma and chroma components, the number of blending lines for the luma component is reduced from 4 to 3 only when the fractional part of an absolute value of the luma MV is larger than 0.5, and the number of blended lines for the chroma components is reduced from 2 to 1 only when the fractional part of an absolute value of the chroma MV is larger than 0.5. In an embodiment considering both luma and chroma components, a number of blending lines for the luma component is reduced from 4 to 3 only when the fractional part of an absolute value of the luma MV is larger than 0.5, and a number of blended lines for the chroma components is reduced from 2 to 1 if the number of blending lines for the luma component is reduced from 4 to 3. In another embodiment, the number of OBMC blending lines for the luma component is reduced from 4 to 3 only when the fractional part of an absolute value of the luma MV in list 0 or list 1 is larger than or equal to 0.5. In an embodiment, the number of OBMC blending lines for the luma component is reduced from 4 to 3 only when the fractional part of an absolute value of the luma MV is larger than or equal to 0.5, and the number of OBMC blending lines for the chroma components is reduced from 2 to 1 only when the fractional part of an absolute value of the chroma MV is larger than or equal to 0.5. In an embodiment, the number of OBMC blending lines for the luma component is reduced from 4 to 3 only when the fractional part of an absolute value of the luma MV is larger than or equal to 0.5, and the number of OBMC blending lines for the chroma components is reduced from 2 to 1 if the number of OBMC blending lines for the luma component is reduced from 4 to 3.

Under the second implementation scheme, OBMC regions are generated just before the OBMC blending process of a current block. An embodiment of reducing the number of OBMC blending lines first checks a luma or chroma MV of a neighboring block for deriving an OBMC region for a luma component or chroma components respectively. For example, an exemplary system reduces the number of blending lines at a top block boundary for the luma component from 4 to 3 only when the fractional part of an absolute value of the luma MV in the vertical direction is larger than 0.5, and the number of blending lines at the top block boundary for the luma component is 4 otherwise. Similarly, the number of OBMC blending lines at a left block boundary is 3 for the luma component only when the fractional part of an absolute value of the luma MV in the horizontal direction is larger than 0.5. In another example, the number of OBMC blending lines at the top or left block boundary for the luma component is reduced from 4 to 3 only when the fractional part of an absolute value of the luma MV in the vertical or horizontal direction is larger than 0.5, and the number of OBMC blending lines at the top or left block boundary for the chroma components is reduced from 2 to 1 only when the fractional part of an absolute value of the chroma MV in the vertical or horizontal direction is larger than 0.5. In another example, the number of OBMC blending lines at the top or left block boundary for the luma component is reduced from 4 to 3 only when the fractional part of an absolute value of the luma MV in the vertical or horizontal direction is larger than 0.5, and the number of OBMC blending lines at the top or left block boundary for the chroma components is reduced from 2 to 1 if the number of OBMC blending lines at the top or left block boundary for the luma component is reduced from 4 to 3. Similarly, the above embodiments may be modified to determine whether to reduce the OBMC blending lines when the fractional part of the absolute value of the luma or chroma MV is larger than or equal to 0.5.

Adaptive Number of OBMC Blending Lines Some embodiments of the present invention adaptively determine the number of OBMC blending lines for a current block according to a width or height of the current block depending on the direction of OBMC blending. For example, the number of OBMC blending lines for a left boundary of the current block depends on the width of the current block, and the number of OBMC blending lines for a top boundary of the current block depends on the height of the current block. In an exemplary embodiment, the number of OBMC blending lines for the luma component is reduced from 4 to 2 if the width or height of the current block is less than a predefined threshold. For example, the number of OBMC blending lines for the luma component at the left block boundary is reduced from 4 to 2 if the width of the current block is less than a first predefined threshold, and the number of OBMC blending lines is 4 if the width of the current block is larger than or equal to the first predefined threshold. The number of OBMC blending lines for the luma component at the top block boundary is reduced from 4 to 2 if the height of the current block is less than a second predefined threshold, and the number of OBMC blending lines is 4 if the height of the current block is larger than or equal to the second predefined threshold. The first and second predefined thresholds may be the same or different. In the following examples, the first and second predefined thresholds are both 8. In one example, if the width of a current block is less than 8 and the height of the current block is larger than or equal to 8, the number of blending lines for the luma component at the left boundary is reduced from 4 to 2, however, the number of blending lines for the luma component at the top boundary remains 4. In another example, if the width of a current block is less than 8 and the height of the current block is also less than 8, both the numbers of blending lines for the luma component at the left and top boundaries are reduced from 4 to 2. In another example, if the height of a current block is less than 8 and the width of the current block is larger than or equal to 8, the number of blending lines for the luma component at the top boundary is reduced from 4 to 2, and the number of blended lines for the luma component at the left boundary remains 4.

Some other embodiments of adaptively determining the number of OBMC blending lines determine the number of OBMC blending lines according to a length of an interpolation filter used in motion compensation. The interpolation filter length is also known as a number of taps in the interpolation filter. For example, more OBMC blending lines are blended when a longer interpolation filter is employed. In one specific embodiment, (L/2)-1 OBMC blending lines are used when the length of the interpolation filter is L.

In one embodiment, adaptively determining the number of OBMC blending lines may be enabled or disabled according to a flag, and the number of blending lines is always equal to 4 for the luma component and 2 for the chroma components when the flag indicate adaptive number of OBMC blending lines is disabled.

In one embodiment, the number of OBMC blending lines for the chroma components is reduced in accordance with the luma component. For example, when the number of blending lines in the luma component is reduced from 4 to 2, the number of blending lines in the chroma components is reduced from 2 to 1; otherwise the numbers of blending lines is 4 for the luma component and 2 for the chroma components.

The above OBMC blending lines reducing or determining methods may be combined with one of the methods of generating OBMC regions by the integer MV(s). For example, the number of OBMC blending lines is reduced from 4 to 3 when the OBMC regions are generated by an integer MV converted by rounding to a nearest integer. In some embodiments, all MVs are converted to integer MVs before generating the OBMC regions, in some other embodiments, a MV for generating an OBMC region is converted to an integer MV when a current block or a neighboring block satisfies a predefined criterion. The predefined criterion may be related to one or a combination of a size of the current or neighboring block, a width of the current or neighboring block, a height of the current or neighboring block, a prediction direction of the current or neighboring block, a fractional part of the MV(s) of the current or neighboring block, and MV(s) of the current/neighboring block. An embodiment of conditionally changing a MV to an integer MV for chroma components depends on whether the corresponding MV for the luma component is changed to an integer MV. For example, the MV for the chroma components is converted to an integer MV if the MV for the luma component is converted to an integer MV. In another embodiment, when the luma MV is changed to an integer MV, the MV for the chroma components is derived from the integer MV of the luma component. In yet another embodiment, when the luma MV is changed to an integer MV, the MV for the chroma components is also changed to an integer MV, and the number of OBMC blending lines for the luma component is reduced from 4 to 3 and the number of OBMC blending lines for the chroma components is reduced from 2 to 1.

Figure 12A:
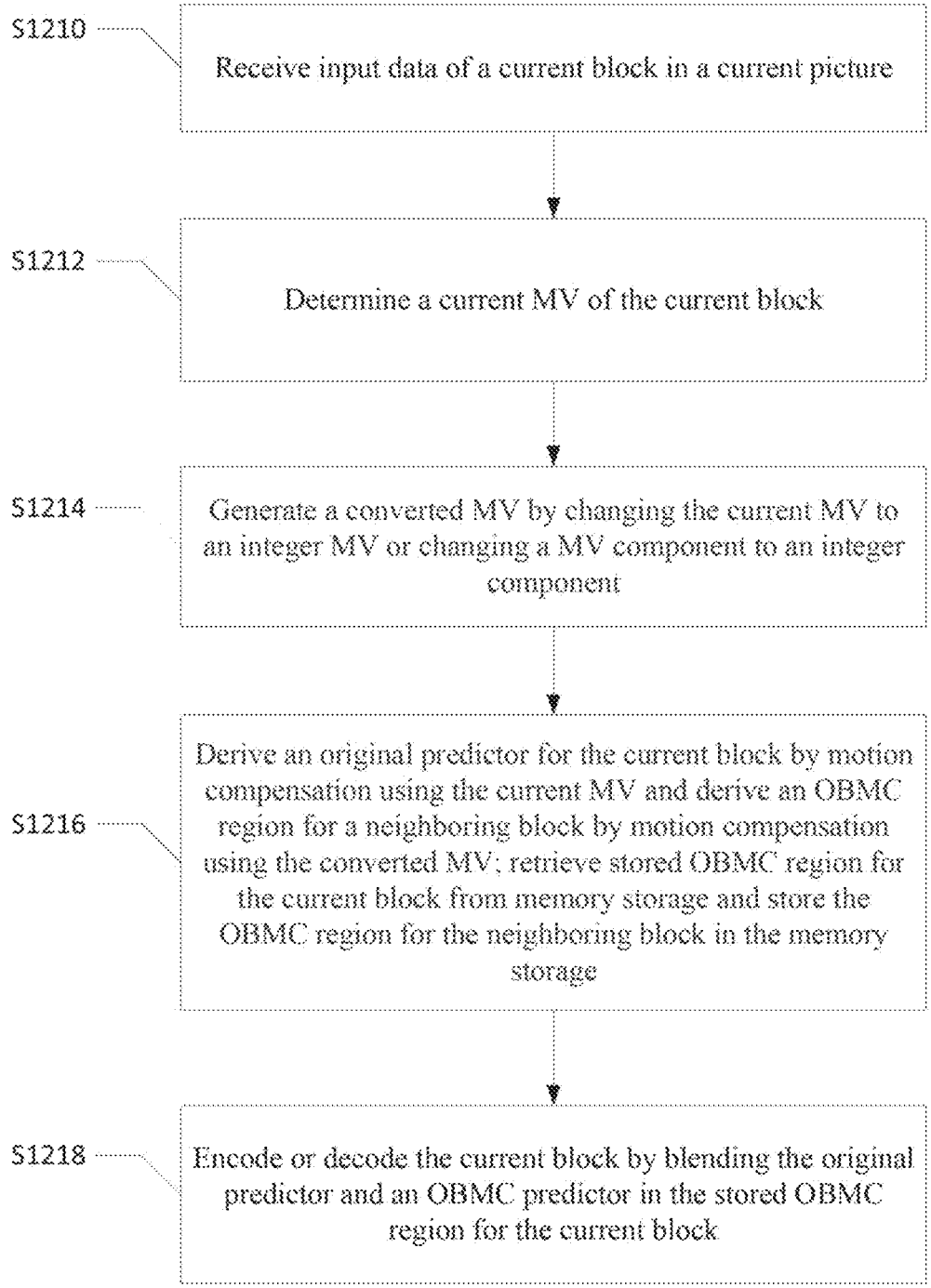
FIG. 12A is a flowchart shows an exemplary embodiment of processing a current block with OBMC using the first OBMC implementation scheme.
Figure 12B:
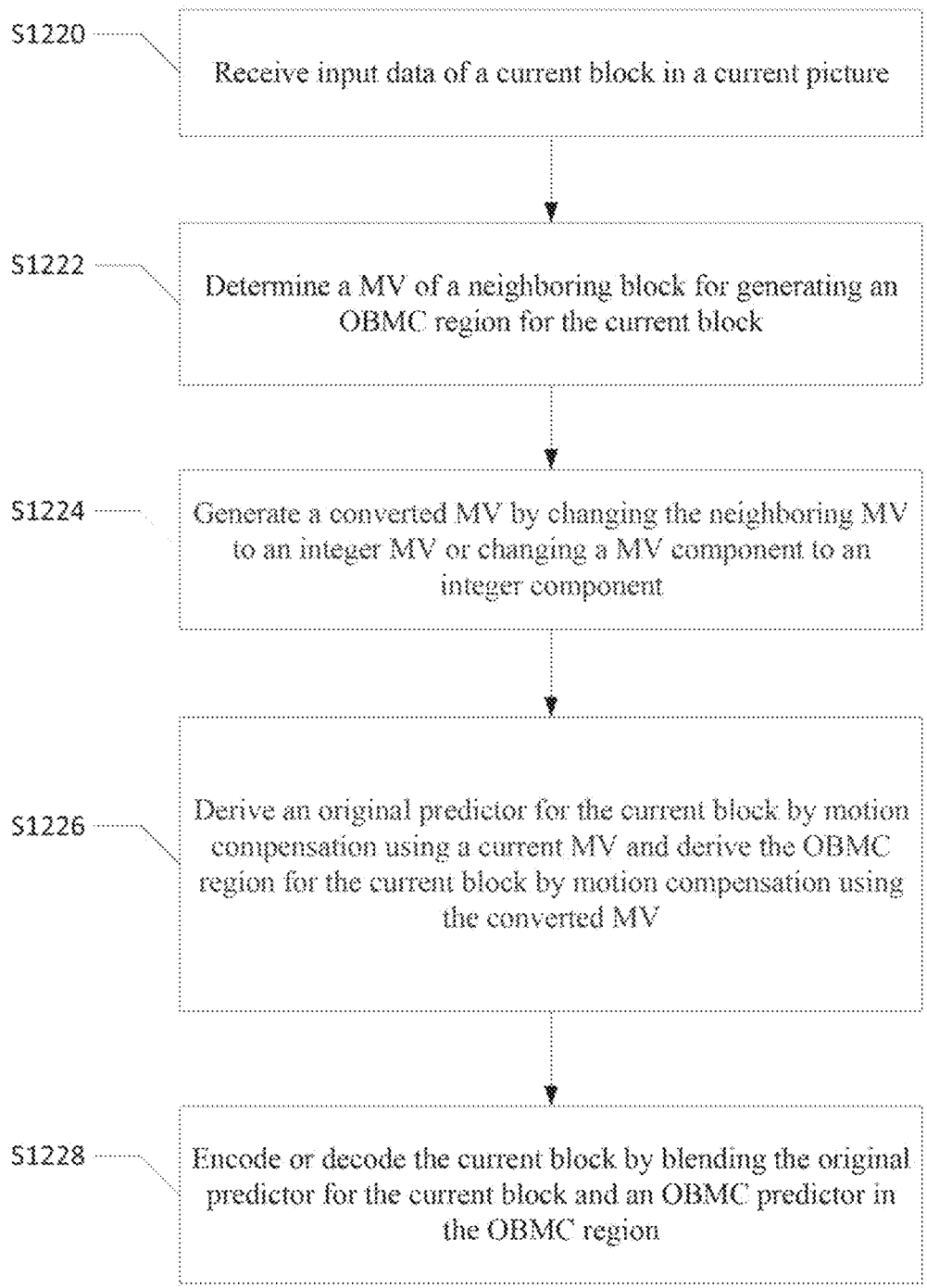
FIG. 12B is a flowchart shows an exemplary embodiment of processing a current block with OBMC using the second OBMC implementation scheme.

Exemplary Flowcharts FIGS. 12A and 12B illustrate two exemplary flowcharts of a video encoding or decoding system for encoding or decoding blocks with Overlapped Block Motion Compensation (OBMC). FIG. 12A demonstrates an example of processing a current block according to the first OBMC implementation scheme, and FIG. 12B demonstrates an example of processing a current block according to the second OBMC implementation scheme. In Step S1210 of FIG. 12A, the video encoding or decoding system receives input data associated with a current block in a current picture. At the encoder side, the input data corresponds to pixel data to be encoded. At the decoder side, the input data corresponds to coded data or prediction residual to be decoded. In Step S1212, a current MV is determined for generating at least an OBMC region for one or more neighboring block, where the current MV may have a List 0 MV and a List 1 MV when the current block is bi-predicted. The current MV is changed to a converted MV by rounding or truncating to an integer MV or changing a MV component to an integer component in Step S1214. In Step S1216, the video encoding or decoding system derives an original predictor for the current block by motion compensation using the current MV and derives one or more OBMC regions by motion compensation using the converted MV for the one or more neighboring blocks. The one or more OBMC regions are pre-generated for one or more neighboring blocks. For example, the converted MV is used to locate OBMC predictors for a right OBMC region and a bottom OBMC region, and the right and bottom OBMC regions are later used to process a right and bottom neighboring block. The video encoding or decoding system retrieves one or more OBMC predictors in one or more OBMC regions associated with the current block from memory storage, and stores the one or more OBMC regions for the one or more neighboring blocks in the memory storage. In Step S1218, the current block is encoded or decoded by blending the original predictor for the current block and the one or more OBMC predictors associated with the current block.

Step S1220 in FIG. 12B receives input video data of a current block in a current picture. A MV of a neighboring block is determined in Step S1222 for generating an OBMC region for the current block. In this example shown in FIG. 12B, OBMC is only applied to one side of the current block, so only one OBMC region generated by one neighboring block is required; however, two or more OBMC regions may be generated when OBMC is applied to two or more sides of the current block. In Step S1224, the video encoding or decoding system generates a converted MV by changing the MV of the neighboring block to an integer MV or by changing a MV component of the MV to an integer component. An original predictor for the current block is derived by motion compensation using a current MV of the current block, and an OBMC predictor in the OBMC region for the current block is derived by motion compensation using the converted MV in Step S1226. The video encoding or decoding system encodes or decodes the current block by blending the original predictor for the current block and the OBMC predictor for the current block in Step S1228.

OBMC Interacts with BiCW Bi-prediction with CU weights (BiCW), also known as Generalized Bi-prediction (GBI), is a technique using a first reference block selected from a first reference picture and a second reference block selected from a second reference picture to code a current block. Each reference block is associated with a weight, and the current block is predicted by a weighted sum of the two reference blocks. In an embodiment of applying OBMC to a current block having a neighboring block coded in BiCW, an OBMC region is generated by equal weights regardless of the actual BiCW weights of the neighboring block. In another embodiment of applying OBMC to a current block having a neighboring block coded in BiCW, BiCW weights of the neighboring block are stored and an OBMC region is generated according to the actual BiCW weights of the neighboring block.

OBMC Interacts with BDOF In general, a video coding system performs Bidirectional Optical Flow (BDOF) during motion compensation. Normally, a motion vector of a current block identifies the location of a reference block with respect to the current block in a reference picture. When BDOF is applied to the current block, the video coding system modifies the motion vector on a per-pixel basis for the current block. That is, rather than retrieving each pixel of the reference block as a block unit, according to BDOF, the video coding system determines per-pixel modifications to the motion vector for the current block, and constructs the reference block such that the reference block includes reference pixels identified by the motion vector and the per-pixel modification for the corresponding pixel of the current block. In an embodiment of applying BDOF to generate an OBMC region, the video coding system retrieves reference pixels identified by the original MV and the per-pixel modification for the corresponding pixel of the OBMC region. In another embodiment, BDOF technique is disabled for generating OBMC regions.

Video Encoder and Decoder Implementations The foregoing proposed video processing methods can be implemented in video encoders or decoders. For example, a proposed video processing method is implemented in a predictor derivation module of an encoder, and/or predictor derivation module of a decoder. In another example, a proposed video processing method is implemented in a motion compensation module of an encoder, and/or a motion compensation module of a decoder. Alternatively, any of the proposed methods is implemented as a circuit coupled to the predictor derivation or motion compensation module of the encoder and/or the predictor derivation module or motion compensation module of the decoder, so as to provide the information needed by the predictor derivation module or the motion compensation module.

FIG. 13 illustrates an exemplary system block diagram for a Video Encoder 1300 implementing various embodiments of the present invention. Intra Prediction 1310 provides intra predictors based on reconstructed video data of a current picture. Inter Prediction 1312 performs motion estimation (ME) and motion compensation (MC) to provide inter predictors based on video data from other picture or pictures. To encode a current block by an overlapped sub-block motion compensation coding tool according to some embodiments of the present invention, each overlapped region in the current block is predicted by blending two or more initial predictors derived by corresponding sub-block MVs of the overlapped region. In some other embodiments, the Inter Prediction 1312 derives an OBMC predictor in an OBMC region by motion compensation using a converted MV, where the converted MV is generated by changing a MV to an integer MV or changing a MV component to an integer component. A final predictor for each block is generated by blending one or more OBMC predictors with an original predictor in the Inter Prediction 1312. Either Intra Prediction 1310 or Inter Prediction 1312 supplies the selected predictor to Adder 1316 to form prediction errors, also called prediction residual. The prediction residual of the current block are further processed by Transformation (T) 1318 followed by Quantization (Q) 1320. The transformed and quantized residual signal is then encoded by Entropy Encoder 1332 to form a video bitstream. The video bitstream is then packed with side information. The transformed and quantized residual signal of the current block is processed by Inverse Quantization (IQ) 1322 and Inverse Transformation (IT) 1324 to recover the prediction residual. As shown in FIG. 13, the prediction residual is recovered by adding back to the selected predictor at Reconstruction (REC) 1326 to produce reconstructed video data. The reconstructed video data may be stored in Reference Picture Buffer (Ref. Pict. Buffer) 1330 and used for prediction of other pictures. The reconstructed video data recovered from REC 1326 may be subject to various impairments due to encoding processing; consequently, In-loop Processing Filter 1328 is applied to the reconstructed video data before storing in the Reference Picture Buffer 1330 to further enhance picture quality.

A corresponding Video Decoder 1400 for decoding the video bitstream generated from the Video Encoder 1300 of FIG. 13 is shown in FIG. 14. The video bitstream is the input to Video Decoder 1400 and is decoded by Entropy Decoder 1410 to parse and recover the transformed and quantized residual signal and other system information. The decoding process of Decoder 1400 is similar to the reconstruction loop at Encoder 1300, except Decoder 1400 only requires motion compensation prediction in Inter Prediction 1414. Each block is decoded by either Intra Prediction 1412 or Inter Prediction 1414. Switch 1416 selects an intra predictor from Intra Prediction 1412 or an inter predictor from Inter Prediction 1414 according to decoded mode information. Inter Prediction 1414 performs overlapped sub-block motion compensation on a current block by blending initial predictors derived from overlapped sub-block MVs according to some exemplary embodiments. Inter Prediction 1414 generates an OBMC region using one or more derived MVs for blending with an original predictor according to some other exemplary embodiments. The one or more derived MVs are generated by changing one or more MVs to one or more integer MVs or changing a MV component of the one or more MVs to an integer component. The transformed and quantized residual signal associated with each block is recovered by Inverse Quantization (IQ) 1420 and Inverse Transformation (IT) 1422. The recovered residual signal is reconstructed by adding back the predictor in REC 1418 to produce reconstructed video. The reconstructed video is further processed by In-loop Processing Filter (Filter) 1424 to generate final decoded video. If the currently decoded picture is a reference picture for later pictures in decoding order, the reconstructed video of the currently decoded picture is also stored in Ref. Pict. Buffer 1426.

Various components of Video Encoder 1300 and Video Decoder 1400 in FIG. 13 and FIG. 14 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 1300 and Decoder 1400, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 13 and 14, Encoder 1300 and Decoder 1400 may be implemented in the same electronic device, so various functional components of Encoder 1300 and Decoder 1400 may be shared or reused if implemented in the same electronic device.

Embodiments of the video processing method for encoding or decoding may be implemented in a circuit integrated into a video compression chip or program codes integrated into video compression software to perform the processing described above. For examples, determining of a candidate set including an average candidate for coding a current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method for processing blocks with Overlapped Block Motion Compensation (OBMC) in a video coding system, comprising:
    receiving input video data associated with a current block in a current picture;
    determining one or more Motion Vectors (MVs) for generating an OBMC region;
    generating one or more converted MVs by changing said one or more MVs to one or more integer MVs or changing a MV component of said one or more MVs to an integer component;
    deriving the OBMC region by motion compensation using said one or more converted MVs;
    applying OBMC by blending an OBMC predictor in the OBMC region with an original predictor; and
    encoding or decoding the current block.

2. The method of claim 1, wherein the OBMC region is derived from said one or more converted MVs generated from one or more current MVs of the current block, the OBMC region is pre-generated for a right or bottom neighboring block of the current block, and the OBMC region is blended with the original predictor of the right or bottom neighboring block when processing the right or bottom neighboring block.

3. The method of claim 2, wherein said one or more converted MVs are generated by changing a horizontal component of said one or more MVs to an integer when said one or more converted MVs are used to derive a right OBMC region for the right neighboring block, or said one or more converted MVs are generated by changing a vertical component of said one or more MVs to an integer when said one or more converted MVs are used to derive a bottom OBMC region for the bottom neighboring block.

4. The method of claim 2, wherein the OBMC region is derived by motion compensation using said one or more converted MVs if a prediction direction of the current block is bi-prediction, and the OBMC region is derived by motion compensation using said one or more MVs without conversion if the prediction direction of the current block is uni-prediction.

5. The method of claim 2, wherein the OBMC region is derived by motion compensation using said one or more converted MVs if the current block or neighboring block is bi-predicted, and the OBMC region is derived by motion compensation using said one or more MVs without conversion if both the current block and neighboring block are uni-predicted.

6. The method of claim 2, wherein the OBMC region is pre-generated only when both horizontal and vertical components of said one or more MVs are not integers, or the OBMC region is pre-generated only when either one of the horizontal and vertical components of said one or more MVs is not an integer.

7. The method of claim 2, wherein the OBMC region is pre-generated only when a predefined component of said one or more MVs of the current block is not an integer, and the predefined component depends on whether the OMBC region is for the right or bottom neighboring block.

8. The method of claim 2, wherein the OMBC region is pre-generated by one of List 0 and List 1 MVs when the current block is bi-predicted with one integer MV and one fractional MV, and the OBMC region is pre-generated by the converted MV generated from the fractional MV, wherein horizontal and vertical components of the fractional MV are both fractional or only a predefined component of the fractional MV is fractional.

9. The method of claim 8, wherein the OBMC predictor in the pre-generated OBMC region is assigned with a weighting factor lowering than an original weighting factor when blending with the original predictor of the right or bottom neighboring block, wherein the original weighting factor is used for an OBMC predictor in a pre-generated OBMC region when the current block is not bi-predicted with one integer MV and one fractional MV.

10. The method of claim 1, wherein the OBMC region is derived from said one or more converted MVs generated from one or more neighboring MVs of a neighboring block, the OBMC region is derived for the current block, and the OBMC region is blended with the original predictor of the current block.

11. The method of claim 10, wherein the OBMC region is derived by motion compensation using said one or more converted MVs if a prediction direction of the neighboring block is bi-prediction, and the OBMC region is derived by motion compensation using said one or more MVs without conversion if the prediction direction of the neighboring block is uni-prediction.

12. The method of claim 10, wherein the OBMC region is derived by motion compensation using said one or more converted MVs if the current block or neighboring block is bi-predicted, and the OBMC region is derived by motion compensation using said one or more MVs without conversion if both the current block and neighboring block are uni-predicted.

13. The method of claim 10, wherein the OBMC region is derived by motion compensation using said one or more converted MVs only if the current block is bi-predicted with integer MVs and the neighboring block is bi-predicted, otherwise the OBMC region is derived by motion compensation using said one or more MVs without conversion.

14. The method of claim 1, wherein said one or more converted MVs are generated by truncating or rounding into one or more integer MVs.

15. The method of claim 1, further comprising checking a similarity of MVs of the current block and a neighboring block, and adaptively skipping blending the OBMC predictor in the OBMC region with the original predictor according to the similarity of the MVs.

16. The method of claim 15, wherein said checking the similarity of the MVs is performed before or after said generating said one or more converted MVs.

17. The method of claim 1, wherein a maximum number of OBMC blending lines is 3 when the current block is a luminance (luma) block, and a maximum number of OBMC blending lines is 1 or 2 when the current block is a chrominance (chroma) block.

18. The method of claim 1, wherein a number of OBMC blending lines in the OBMC region for a luma component is 3 if a fractional part of an absolute value of said one or more MVs is larger than 0.5 or is larger than or equal to 0.5, otherwise the number of OBMC blending lines in the OBMC region for the luma component is 4; or a number of OBMC blending lines in the OBMC region for chroma components is 1 if a fractional part of an absolute value of said one or more MVs is larger than 0.5 or is larger than or equal to 0.5 or if a number of OBMC blending lines in the OBMC region for a luma component is 3, otherwise the number of OBMC blending lines in the OBMC region for the chroma component is 2.

19. The method of claim 1, wherein the OBMC region is derived by said one or more converted MVs of a top neighboring block, and a number of OBMC blending lines in the OBMC region for a luma component is 3 only if a fractional part of an absolute value of said one or more MVs in a vertical direction is larger than 0.5 or is larger than or equal to 0.5, otherwise the number of OBMC blending lines for the luma component is 4; or the OBMC region is derived by said one or more converted MVs of a left neighboring block, and a number of OBMC blending lines in the OBMC region for a luma component is 3 only if a fractional part of an absolute value of said one or more MVs in a horizontal direction is larger than 0.5 or is larger than or equal to 0.5, otherwise the number of OBMC blending lines for the luma component is 4.

20. The method of claim 1, wherein the OBMC region is derived by said one or more converted MVs of a top neighboring block, and a number of OBMC blending lines in the OBMC region for chroma components is 1 only if a fractional part of an absolute value of said one or more MVs in a vertical direction is larger than 0.5 or is larger than or equal to 0.5 or a number of OBMC blending lines in the OBMC region for a luma component is 3, otherwise the number of OBMC blending lines for the chroma components is 2; or the OBMC region is derived by said one or more converted MVs of a left neighboring block, and a number of OBMC blending lines in the OBMC region for chroma components is 1 only if a fractional part of an absolute value of said one or more MVs in a horizontal direction is larger than 0.5 or is larger than or equal to 0.5, otherwise the number of OBMC blending lines for the chroma components is 2; or the OBMC region is derived by said one or more converted MVs of a left neighboring block, and a number of OBMC blending lines in the OBMC region for chroma components is 1 if a number of OBMC blending lines in the OBMC region for a luma component is 3, otherwise the number of OBMC blending lines for the chroma components is 2.

21. The method of claim 1, wherein a number of OBMC blending lines is adaptively determined according to a length of an interpolation filter used in motion compensation.

22. A video processing method for processing blocks with Overlapped Block Motion Compensation (OBMC) in a video coding system, comprising:
receiving input video data associated with a current block in a current picture;
determining a number of OBMC blending lines for a left boundary of the current block according to a width of the current block, or determining a number of OBMC blending lines for a top boundary of the current block according to a height of the current block;

deriving an original predictor of the current block by motion compensation using one or more MVs of the current block;

deriving an OBMC predictor of a left OBMC region having the number of OBMC blending lines for the left boundary by motion compensation using one or more MVs of a left neighboring block of the current block, or deriving an OBMC predictor of a top OBMC region having the number of OBMC blending lines for the top boundary by motion compensation using one or more MVs of a top neighboring block of the current block;

applying OBMC to the current block by blending the OBMC predictor with the original predictor of the current block for the number of OBMC blending lines; and encoding or decoding the current block.

23. The method of claim 22, wherein the number of OBMC blending lines at the left boundary of a luminance (luma) component is 2 if the width of the current block is less than a predefined threshold, and the number of OBMC blending lines at the left boundary of the luma component is 4 if the width of the current block is larger than or equal to the predefined threshold; or the number of OBMC blending lines at the top boundary of a luma component is 2 if the height of the current block is less than a predefined threshold, and the number of OBMC blending lines at the top boundary of the luma component is 4 if the height of the current block is larger than or equal to the predefined threshold.

24. The method of claim 22, wherein the number of OBMC blending line at the left boundary of chrominance (chroma) components is 1 if the width of the current block is less than a predefined threshold, and the number of OBMC blending lines at the left boundary of the chroma components is 2 if the width of the current block is larger than or equal to the predefined threshold; or the number of OBMC blending line at the top boundary of chroma components is 1 if the height of the current block is less than a predefined threshold, and the number of OBMC blending lines at the top boundary of the chroma components is 2 if the height of the current block is larger than or equal to the predefined threshold.

25. The method of claim 22, further comprising determining a flag indicating adaptive number of OBMC blending lines is enabled or disabled, the number of OBMC blending lines for a luma component is always 4 and the number of OBMC blending lines for chroma components is always 2 if the flag indicates adaptive number of OBMC blending lines is disabled.

26. The method of claim 22, wherein the number of OBMC blending lines for a luma component is determined according to the width or height, and the number of OBMC blending lines for chroma components is determined according to the number of OBMC blending lines for the luma component.

* * * * *